US012795228B2

(12) United States Patent
Speasl et al.

(10) Patent No.: US 12,795,228 B2
(45) Date of Patent: Nov. 10, 2026

(54) SYSTEMS AND METHODS FOR IMAGING WITH A FIRST CAMERA TO SIMULATE A SECOND CAMERA

(71) Applicant: ImageKeeper LLC, Las Vegas, NV (US)

(72) Inventors: Jerry Speasl, Las Vegas, NV (US); Michael Patterson, Sherman, TX (US); Marc Roberts, St. Louis, MO (US)

(73) Assignee: Imagekeeper LLC, Las Vegas, NV (US)

( * ) Notice: Subject to any disclaimer, the term of this patent is extended or adjusted under 35 U.S.C. 154(b) by 18 days.

(21) Appl. No.: 18/429,207

(22) Filed: Jan. 31, 2024

(65) Prior Publication Data

US 2024/0267611 A1 Aug. 8, 2024

Related U.S. Application Data

(60) Provisional application No. 63/442,814, filed on Feb. 2, 2023.

(51) Int. Cl.
*H04N 23/61* (2023.01)
*H04N 23/617* (2023.01)
*H04N 23/62* (2023.01)

(52) U.S. Cl.
CPC ........... *H04N 23/617* (2023.01); *H04N 23/62* (2023.01)

(58) Field of Classification Search
CPC ............................. H04N 23/617; H04N 23/62
See application file for complete search history.

(56) References Cited

U.S. PATENT DOCUMENTS

2017/0332012 A1* 11/2017 Choe .................... H04N 23/667
2022/0109798 A1* 4/2022 Benderius .............. G06V 20/41

FOREIGN PATENT DOCUMENTS

WO WO 2024/163777 8/2024

OTHER PUBLICATIONS

PCT Application No. PCT/US2024/014053, International Search Report and Written Opinion dated May 20, 2024.
PCT Application No. PCT/US2024/014053, International Preliminary Report on Patentability dated Aug. 14, 2025.

* cited by examiner

*Primary Examiner* — Lin Ye
*Assistant Examiner* — Fayez A Bhuiyan
(74) *Attorney, Agent, or Firm* — Polsinelli LLP

(57) ABSTRACT

Systems and methods are described herein for media capture and processing. In some examples, a media capture and processing system that includes a first camera receives information about a second camera. The system generates a device profile for the second camera based on the information about the second camera. The system captures a digital media asset using the first camera and using a digital media capture setting that is associated with the device profile and that simulates at least a first aspect of media capture using the second camera. The system processes the digital media asset using a digital media asset processing setting that is associated with the device profile to generate a processed digital media asset. The digital media asset processing setting simulates at least a second aspect of media capture using the second camera. The system outputs the processed digital media asset.

20 Claims, 14 Drawing Sheets

SYSTEMS AND METHODS FOR IMAGING WITH A FIRST CAMERA TO SIMULATE A SECOND CAMERA

CROSS-REFERENCE TO RELATED APPLICATION

The present application claims priority benefit of U.S. provisional application 63/442,814 titled "Systems and Methods for Imaging with a First Camera to Simulate a Second Camera," filed Feb. 2, 2023, the disclosure of which is incorporated herein by reference.

TECHNICAL FIELD

This application is related to a media capture system. More specifically, this application relates to systems and methods for generating a profile for a first camera and setting image capture settings and/or image capture settings for a second camera based on the profile so that the second camera can simulate the first camera.

BACKGROUND

Digital media includes various types of media, such as images, audio, video, and/or depth data (e.g., point clouds or three-dimensional media). Digital media can be captured using sensor(s) of capture device(s), for instance using image sensor(s) of camera(s). Different capture devices (and/or associated sensors) can be calibrated differently, and/or can capture media differently based on hardware differences, software differences, or a combination thereof. Certain capture devices, such as cameras, include interfaces (e.g., hardware interfaces and/or software interfaces) that a user can use to adjust media capture settings and/or media processing settings. Such interfaces can vary from one capture device to another, in some cases with certain interface elements missing in one capture device that may be present in another.

SUMMARY

Systems and methods for media capture and processing are described herein. In some examples, a media capture and processing system that includes a first camera receives information about a second camera. The system generates a device profile for the second camera based on the information about the second camera. The system captures a digital media asset using the first camera and using a digital media capture setting that is associated with the device profile and that simulates at least a first aspect of media capture using the second camera. The system processes the digital media asset using a digital media asset processing setting that is associated with the device profile to generate a processed digital media asset. The digital media asset processing setting simulates at least a second aspect of media capture using the second camera. The system outputs the processed digital media asset.

BRIEF DESCRIPTION OF THE DRAWINGS

The detailed description is set forth with reference to the accompanying figures.

DETAILED DESCRIPTION

Figure 1:
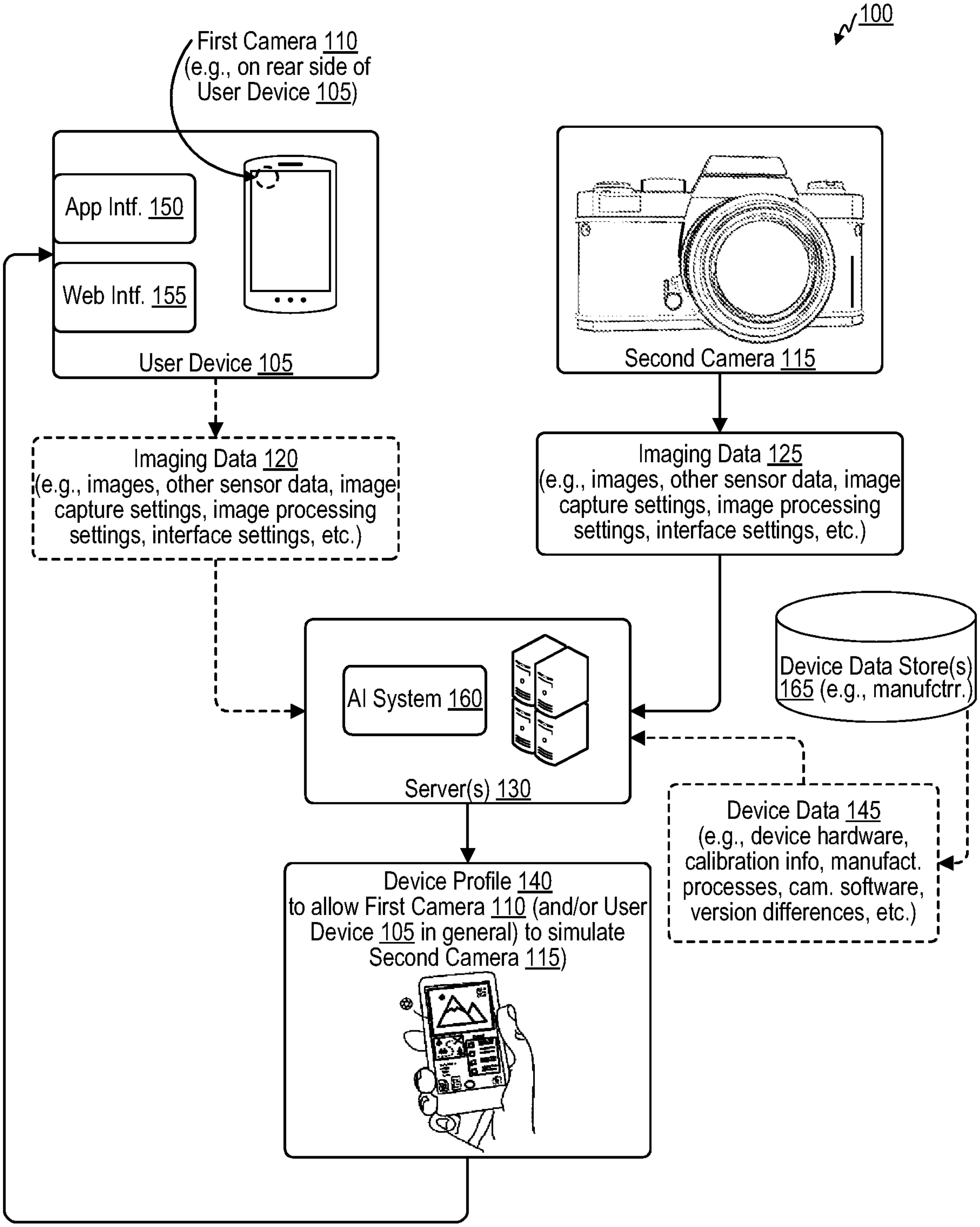
FIG. 1 is a block diagram illustrating a process of generation of a device profile for a second camera that allows a first camera of a user device to simulate the second camera, in accordance with some examples.

Digital media includes various types of media, such as images, audio, video, documents, multimodality media spatial 3D image and video capture streaming data, multi-sensor data, metadata, depth data (e.g., point clouds or three-dimensional models), or combinations thereof. Digital media can be captured using sensor(s) of capture device(s). For instance, images and videos can be captured using the image sensor(s) of a camera(s), audio can be captured using a microphone(s), and depth data can be captured using depth sensor(s) and/or image sensor(s). Digital media can also be generated, for instance, by rendering image(s) of a 3D model. Digital media can include edited media data. For instance, image editing software can process images captured using image sensors to modify various aspects of an image or document.

Different capture devices (and/or associated sensors) can be calibrated differently, and/or can capture media differently based on hardware differences (e.g., different sensor types, different lens types), software differences (e.g., different image signal processor settings for noise reduction, tone mapping, sharpness, color correction, and the like), or a combination thereof. As a result, it can be difficult to try to recreate a look of images (or other media) captured by specific camera (or other capture device) using a different camera (or other capture device).

Certain capture devices, such as cameras, include interfaces (e.g., hardware interfaces and/or software interfaces) that a user can use to adjust media capture settings and/or media processing settings. For instance, a camera can include various buttons, knobs, and dials (e.g., in hardware interfaces or analog interfaces, and/or on a touchscreen or other digital interface or virtual interface) to adjust certain image capture settings. For instance, a camera's interface(s) can be used to adjust image capture settings such as exposure time, aperture size, ISO, digital gain, analog gain, focus, white balance, noise reduction, sharpness, tone mapping, color saturation, or a combination thereof. Such interfaces can vary from one capture device to another, in some cases with certain interface elements missing in one capture device that may be present in another. As a result, it can be difficult to recreate a certain setting from one capture device to another. For instance, even if both cameras have respective knobs or other interfaces that adjust focus on the respective camera, the default focus values might be different between the two cameras, the amount by which the focus changes with each increment of turning the knob might be different between the two cameras, the possible ranges for the focus values may be different between the two cameras, or a combination thereof. Similar differences can also be present for other image capture settings (or other media capture settings)—for instance, differences in default values (e.g., based on hardware and/or calibration), differences in increments by which a setting is adjusted, differences in ranges of values that are possible to set a setting to, and the like.

Systems and methods are described herein for allowing a first camera of a user device to simulate a second camera, and/or for allowing the user device itself to simulate the second camera. The systems and methods described herein generate a device profile for the second camera that allows the first camera and/or the user device to simulate the second camera, for instance by using image capture settings and/or image processing settings that produce images (and/or other media, such as videos) using the first camera that look similar (e.g., that simulate) images (and/or other media, such as videos) that would be captured using the second camera in similar conditions. In some examples, the device profile also allows the first camera (and/or the user device) to simulate aspects of an interface of the second camera, for instance by allowing the user device to show a virtual interface that enables adjustments to image capture settings and/or image processing settings that cause adjustments similar to (e.g., simulating) adjustments made to the second camera using interface(s) (e.g., physical interfaces or virtual interface(s)) of the second camera.

Systems and methods are described herein for media capture and processing. In some examples, a media capture and processing system that includes a first camera receives information about a second camera. The system generates a device profile (e.g., imaging profile) for the second camera based on the information about the second camera (e.g., image capture settings, image processing settings, camera hardware, and/or camera configuration). The device profile for the second camera is configured for simulating use of the second camera (e.g., using the first camera). The system captures a digital media asset (e.g., image(s) and/or video(s)) audio, document using a first camera and using one or more image capture settings associated with the device profile for the second camera. The system processes the digital media asset using one or more image processing settings associated with the device profile for the second camera to generate a processed digital media asset (e.g., processed image(s) and/or video(s)) to simulate the second camera according to the device profile for the second camera. The system outputs the processed digital media asset.

The one or more image capture settings associated with the device profile for the second camera, and/or the one or more image processing settings associated with the imaging profile for the second camera, can simulate, emulate, and/or mimic image capture settings and/or image processing settings and/or camera hardware and/or camera configurations used by the second camera. In some examples, processed digital media asset can simulate, emulate, and/or mimic imaging characteristics of digital media asset(s) (e.g., image(s) and/or video(s)) audio(s)/documents captured and/or generated by the second camera.

The systems and methods described herein provide a technical improvement to media capture technologies (e.g., cameras) by providing a technical solution to a technical problem of lack of reproducibility of media. For instance, if user sees a particular image of a specific subject that was captured using a specific camera, and the user wishes to capture a similar image of the same subject using the user's own camera under similar conditions (e.g., lighting, time of day), the user may be unable to reproduce an image with an acceptable level of similarity (e.g., with more than a threshold level of similarity) due to differences between the specific camera used to capture the particular image and the user's own camera. In some cases, this lack of reproducibility of media may be frustrating to a user. In some contexts, such as in scientific studies, reproducibility of a scientific finding can be extremely important, since a scientific finding that is not reproducible is often treated as discredited or not reputable. For instance, in some cases, the media being captured may include images or videos of cells receiving a treatment, or the like. In such contexts, for instance, lack of reproducibility of media can hinder scientific progress.

The systems and methods described herein also provide a technical improvement to media capture technologies (e.g., cameras) by improving flexibility of media capture devices (e.g., by allowing a media capture device to simulate another media capture device), by adding otherwise-missing functionality to a media capture devices (e.g., by simulating functionality that is present in another media capture device), by improving efficiency of media capture using a media capture device (e.g., by optimizing media capture settings and/or media processing settings for a specific scenario), or a combination thereof. The systems and methods described herein also describe improvements to security, for instance by certifying media, edits to media, annotations to media, and/or other interactions with media.

FIG. 1 is a block diagram illustrating a process 100 of generation of a device profile 140 for a second camera 115 that allows a first camera 110 of a user device 105 to simulate the second camera 115. The user device 105 is illustrated as a mobile handset, such as a smart phone device or tablet device. The first camera 110 is illustrated as a camera on a surface (e.g., rear surface) of the user device 105. The second camera 115 is illustrated as a digital single-lens reflex (DSLR) camera, a type of camera that generally captures high-quality images and provides flexibility in settings. It should be understood that the user device 105, the first camera 110, and the second camera 115 can each be any type of media capture device.

One or more servers 130 receive imaging data 125 from the second camera 115. The imaging data 125 can include images captured by the second camera 115, other sensor data from other sensor(s) of the second camera 115 during capture of the images, image capture settings used by the second camera 115 in capture of the images, image processing settings used by the second camera 115 to process the settings, various interface settings from interface(s) of the second camera 115, or a combination thereof. For instance, the other sensor(s) of the second camera 115 can include gyroscope(s), gyrometer(s), positioning receiver(s) (e.g., for a global navigation satellite system (GNSS) such as the global positioning system (GPS)), accelerometer(s), inertial measurement unit(s), altimeter(s), barometer(s), compass(es), depth sensor(s), microphone(s), other sensor(s) discussed herein, or a combination thereof. Depth sensor(s) can include, for instance, radio detection and ranging (RADAR) sensor(s), light detection and ranging (LiDAR) sensor(s), sound detection and ranging (SODAR) sensor(s), sound navigation and ranging (SONAR) sensor(s), laser rangefinder(s), time of flight (ToF) sensors, structured light sensor(s), multi-camera (e.g., stereo camera) depth sensor(s), or a combination thereof. The other sensor data can include, for instance, location during capture of each of the images, orientation during capture of each of the images, pose during capture of each of the images, velocity (e.g., speed and/or direction) during capture of each of the images, acceleration during capture of each of the images, depth data (e.g., point cloud, depth map, 3D model) corresponding to each of the image(s), audio corresponding to each of the images, any other type of sensor data corresponding to any of the other sensors listed above, or a combination thereof.

The image capture settings in the imaging data 125 can include, for instance, settings for focus, exposure time, aperture size, ISO, flash, zoom, analog gain, digital gain, color space, or a combination thereof. The image processing settings in the imaging data 125 can include, for instance, noise reduction, sharpness, tone mapping, color saturation, brightness, contrast, blurring, vignetting, low-pass filtering, high-pass filtering, band-pass filtering, deblocking, filtering, color mapping, pixel correction, red eye correction, or a combination thereof. The interface settings from interface(s) of the second camera 115 can include information about what settings certain interfaces of the second camera 115 are set to. The interfaces of the second camera 115 can include hardware interfaces, such as buttons, switches, knobs, rings, dials, sliders, levers, trackpads, or combinations thereof. The hardware interface elements 310 are examples of elements of a hardware interface of the second camera 115. The interfaces of the second camera 115 can include virtual interfaces (e.g., which can also be referred to as digital interfaces), such as interfaces on a screen, such as a touchscreen to be interacted with using a touch interface or a mouse or other interaction element, such as virtual buttons, virtual switches, virtual knobs, virtual dials, virtual rings, virtual sliders, virtual levers, virtual trackpads, or combinations thereof. The virtual interface 405 is an example a virtual interface of the second camera 115. For instance, the imaging data 125 can indicate that a mode knob is set to night mode, that a zoom slider is set to 3× zoom, that a flash switch is turned off, and the like.

In some examples, the server(s) 130 also receive imaging data 120 from the user device 105 and/or the first camera 110. The imaging data 120 can include images captured by the first camera 110, other sensor data from other sensor(s) of the first camera 110 (and/or the user device 105) during capture of the images, image capture settings used by the first camera 110 in capture of the images, image processing settings used by the first camera 110 (and/or the user device 105) to process the settings, various interface settings from interface(s) of the first camera 110 (and/or the user device 105), or a combination thereof. For instance, the user device 105 and/or the first camera 110 can include any of the types of other sensors discussed above with respect to the second camera 115, and the imaging data 120 can include any of the types of other sensor data discussed above with respect to the second camera 115. The user device 105 and/or the first camera 110 can include any of the types of image capture settings and/or image processing settings discussed above with respect to the second camera 115, which can also be indicated in the imaging data 120.

In some examples, the server(s) 130 also receive device data 145 from one or more device data store(s) 165. The device data store(s) 165 may for example, be database(s) or other data structure(s) that store information about various devices, for instance including data store(s) associated with manufacturer(s) of those devices, merchants that sell those device(s), services that repair those device(s), data source(s) associated with a network, data source(s) on the Internet, or combination(s) thereof. In some examples, the device data 145 can include information about the user device 105, information about the first camera 110, information about the second camera 115, or a combination thereof. For instance, in some examples, the device data 145 can include information about such devices, such as what hardware a device includes, how the hardware and/or software of a device is calibrated, manufacturing processes used to manufacture the device(s), camera software used with the camera(s), version differences between different versions of software, revision differences between different hardware revisions, or combinations thereof. For instance, the device data 145 can identify what lens(es) a media capture device uses, what image sensor(s) (and/or other sensor(s)) a media capture device uses, what processor(s) a media capture device uses, how a media capture device was calibrated, and the like. In some examples, the device data 145 can include records of manufacturing defects, differences, and/or fixes implemented by the manufacturer.

The server(s) 130 process at least the imaging data 125 from the second camera 115 to generate a device profile 140 to allow the first camera 110 (and/or the user device 105) to simulate the second camera 115. In some examples, the server(s) 130 process the imaging data 120 from the user device 105, the imaging data 125 from the second camera 115, and/or the device data 145 from the device data store(s) 165 to generate the device profile 140 to allow the first camera 110 (and/or the user device 105) to simulate the second camera 115.

In some examples, the server(s) 130 generate the device profile 140 by comparing available settings for the second camera 115 with available settings for the first camera 110 (e.g., and/or the user device 105), and aligning these settings. For instance, the server(s) 130 can identify that, due to the lenses used in the second camera 115, the field of view of the second camera 115 is slightly zoomed in even at a 1× zoom setting of the second camera 115, to the point where the equivalent zoom setting for the first camera 110 would be 1.4×, for instance indicating in the device profile 140 that the minimum zoom setting for the first camera 110 should be 1.4× while the first camera 110 is simulating the second camera 115. In some examples, the server(s) 130 may determine, based on a comparison of the images in the imaging data 120 and the images in the imaging data 125, that the second camera 115 captures images using warmer colors than the first camera 110, for instance indicating in the device profile that the first camera 110 should modify image capture settings to achieve similarly warmer colors (e.g., by increasing gain for red photodetectors) and/or image processing settings (e.g., by boosting the red color channel after the image is captured).

In some examples, the server(s) 130 generate the device profile 140 by processing the data (e.g., imaging data 120 from the user device 105, the imaging data 125 from the second camera 115, and/or the device data 145 from the device data store(s) 165) using an artificial intelligence (AI) system 160 of the server(s) 130. For instance, in some examples, the AI system 160 of the server(s) includes one or more trained machine learning (ML) model(s), such as the ML model(s) 1225 of FIG. 12. The ML model(s) of the AI system 160 can be pre-trained based on training data, for instance using supervised learning, unsupervised learning, semi-supervised learning, or a combination thereof. In some examples, the training data can include setting(s) for one camera previously determined to simulate another camera.

The user device 105 receives the device profile 140 from the server(s) 130. For instance, the user device 105 can download the device profile 140 or otherwise receive the device profile 140 through an application interface 150 (e.g., through a camera software application, a social media application with a camera function, or some other application), through a web interface 155 (e.g., a web page or website). The user device 105 uses the device profile 140 to simulate the second camera 115 using the first camera 110. For instance, the user device 105 can use the device profile 140 to capture images using the first camera 110 that mimic the look of images captured using the second camera 115. In some examples, the user device 105 can use the device profile 140 to provide virtual interface(s) that mimic interface(s) (e.g., physical and/or virtual) of the second camera 115, for instance to allow for selection of a simulation of the "night mode" of the second camera 115 on the user device 105, with subsequent images captured using the first camera 110 mimicking the look of images captured by the second camera 115 using the night mode" of the second camera 115. In some examples, the user device 105 captures the images and/or provides the virtual interface(s) using the application interface 150, the web interface 155, or a combination thereof. In some examples, a specific software application or website is generated by the server(s) 130 for implementing the device profile 140 on the user device 105, and the user device can download the specific software application (e.g., and use the application as the application interface 150) or access the website via a browser (e.g., and use the website as the web interface 155).

In some examples, the device profile 140 is generated to be generalized, meaning that it is designed for any media capture device (e.g., including the user device 105 as well as other media capture devices) to simulate the second camera 115. Such a generalized device profile may provide, for example, image capture settings and/or image processing settings used by the second camera 115 to capture images (and in some cases, the images themselves). A media capture device that receives such a generalized device profile can use similar image capture settings and/or networking/communications/cloud/and/or image processing settings.

In some examples, the device profile 140 is generated to be specific to a specific device, such as the user device 105. A specific device profile is designed specifically for a specific device (in this case, the user device 105) to simulate the second camera 115. Such a specific device profile may provide, for example, a look-up table (or other data structure) or mathematical formula for converting a setting (e.g., an image capture setting and/or an image processing setting) of the second camera 115 to a set of one or more setting(s) (e.g., image capture setting(s) and/or image processing setting(s)) that recreate the look of that setting in the specific media capture device (e.g., in the user device 105). In some cases, a device profile may recreate a single setting of the second camera 115 using a combination of settings (e.g., image capture setting(s) and/or image processing setting(s)) in the user device 105, for instance to compensate for hardware differences, calibration differences, and/or other differences between the two devices.

For instance, in an illustrative example, the second camera 115 may have a larger maximum aperture size than the first camera 110 of the user device 105. To simulate certain settings of the second camera 115 that use the maximum aperture size (or another aperture size larger than the what the first camera 110 is capable of), the user device 105 can maximize the aperture size of the first camera 110, increase the exposure time of the first camera 110 (to compensate for not being able to increase its aperture size as wide as the second camera 115), and increase sharpness and/or contrast in image processing settings (e.g., to compensate for increased blur caused by the longer exposure time). The amount by which the exposure time is increased can be selected to provide an increase in brightness and/or luminosity that simulates the increase in increase in brightness and/or luminosity that would be provided by the larger aperture size in the second camera 115.

In another illustrative example, the lens of the second camera 115 may introduce a slight perspective warping), for instance a barrel distortion or a fish-eye lens distortion, and a slight colored tint (e.g., red, orange, yellow, green, blue, or violet). In such cases, to simulate certain settings of the second camera 115, the user device 105 can process images captured by the first camera 110 to add warping (e.g., barrel distortion or fish-eye lens distortion) and/or to add a slight colored tint (e.g., red, orange, yellow, green, blue, or violet). The type of warping for the user device 105 to apply, and the amount or level or extent of the warping for the user device 105 to apply, can be selected to simulate the warping that the second camera 115 adds to its images. Likewise, the color tint for the for the user device 105 to apply, and the amount or level or extent of the color tinting for the user device 105 to apply, can be selected to simulate the color tinting that the second camera 115 adds to its images.

In some examples, a virtual camera application (e.g., application interface 150) or website (e.g., web interface 155) running of the user device 105 captures the functionality of the second camera 115 via the device profile 140. In some examples, the device profile 140 is available in the application, the website, and/or in in firmware or via a software development kit (SDK) file, which can be loaded onto a semiconductor secure chipset that can be inserted during smartphone manufacture or later as an update or additional capability, thus having the second camera embedded on the device or separately loaded later via a download software or firmware install function.

Figure 2:
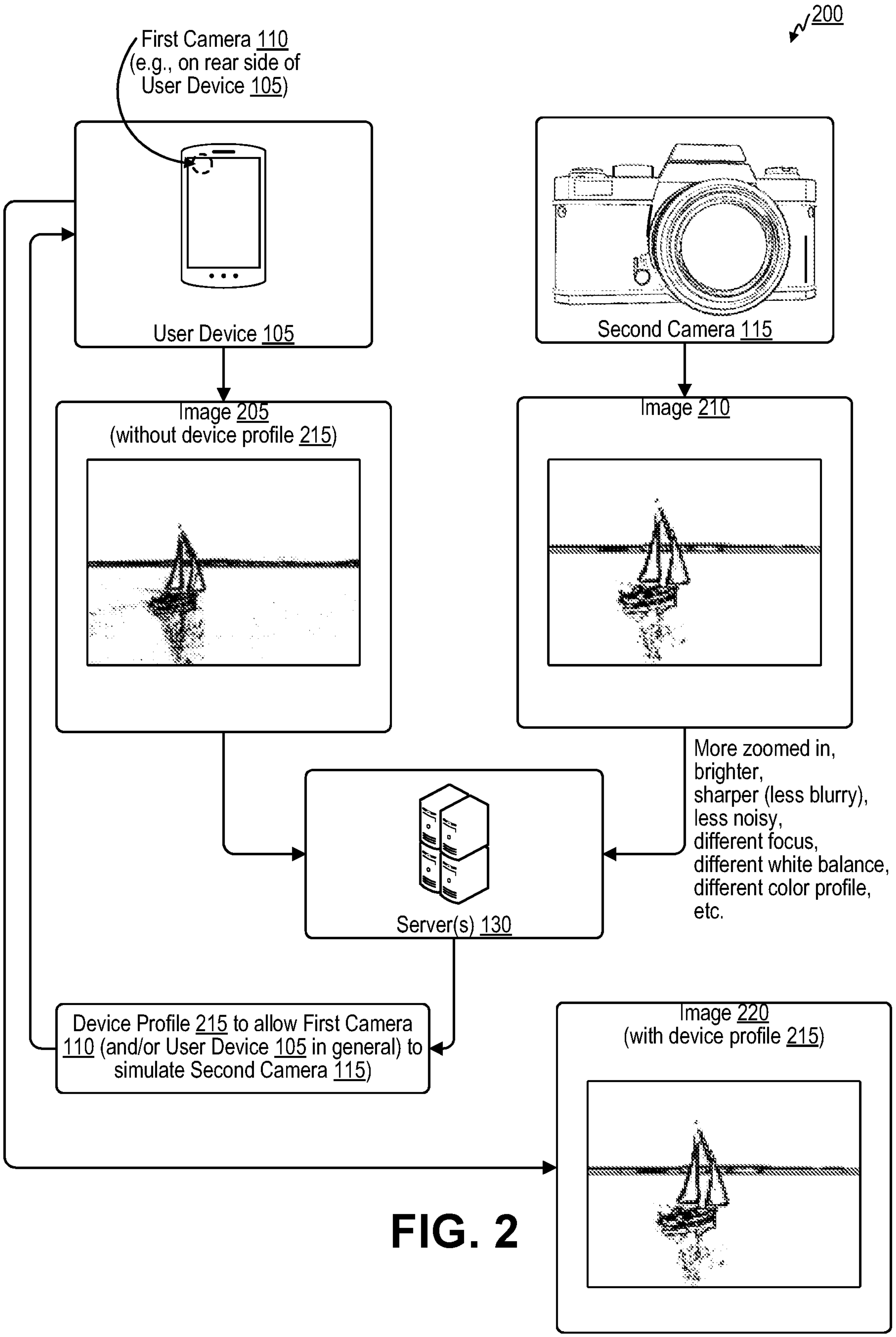
FIG. 2 is a block diagram illustrating examples of an image captured by the second camera, an image captured by the first camera without a device profile for simulating the second camera, and an image captured by the first camera with the device profile for simulating the second camera, in accordance with some examples.

FIG. 2 is a block diagram 200 illustrating examples of an image 210 captured by the second camera 115, an image 205 captured by the first camera 110 without a device profile 215 for simulating the second camera 115, and an image 220 captured by the first camera 110 with the device profile 215 for simulating the second camera 115. The image 205 and the image 210 are both photographs of the same scene, specifically of a sailboat sailing across a body of water, with a reflection of the sailboat visible in the water. In some examples, the imaging data 125 from the second camera 115 includes the image 210, along with other sensor data from other sensor(s) of the second camera 115 during capture of the image 210, image capture settings used by the second camera 115 to capture the image 210, image processing settings applied to the image 210 by the second camera 115, interface settings set at the second camera 115 during capture of the image 210 by the second camera 115, or a combination thereof. Similarly, I=in some examples, the imaging data 120 from the user device 105 includes the image 205, along with other sensor data from other sensor(s) of the user device 105 during capture of the image 205, image capture settings used by the first camera 110 of the user device 105 to capture the image 205, image processing settings applied to the image 205 by the user device 105, interface settings set at the user device 105 during capture of the image 205 by the first camera 110, or a combination thereof.

In some examples, the server(s) 130 receive the image 205 (e.g., as part of the imaging data 120) and/or the image 210 (e.g., as part of the imaging data 125), and generate a device profile 215 based at least in part on the image 205, the image 210, the imaging data 120, the imaging data 125, the device data 145, or a combination thereof. In some examples, the server(s) 130 may incorporate AI tools and can compare images of the same scene or similar scenes from the two media capture devices (e.g., compare the image 205 and the image 210) as part of generating the device profile 215. For instance, the server(s) 130 can compare the image 205 captured by the first camera 110 and the image 210 captured by the second camera 115 and determine that the image 210 captured by the second camera 115 is more zoomed in than the image 205, is brighter than the image 205 (e.g., as visible in the reflection of the boat in the water), is less noisy than the image 205 (e.g., has a higher signal-to-noise ratio than the image 205), has a different focus setting than the image 205 (e.g., is focused on the sailboard rather than the water or the horizon), has a different white balance than the image 205, has a different color profile than the image 205 (e.g., the water looks more green or blue than the image 205), or a combination thereof. The device profile 215 can use this comparison (and the differences identified as a result of the comparison) to identify changes to setting(s) (e.g., image capture setting(s) and/or image processing setting(s)) to be identified in the device profile 215, and to be implemented by the user device 105 when the user device 105 uses the device profile 215 to simulate the second camera 115. The changes to the setting(s) can include, for instance, changes to zoom, exposure, aperture size, digital gain, analog gain, brightness, sharpness, contrast, resolution, pixel size, pixel change, denoising, focus, white balance, color profile, color saturation, tone mapping, other image capture setting(s) and/or image processing setting(s) discussed herein, or a combination thereof.

The image 220 is an example of an image captured by the first camera 110 of the user device 105 with the device profile 215 in use by the user device 105. Based on the device profile 215, the user device 105 captures the image 220 in a way that simulates the second camera 115. Because the scene being photographed is the same scene as depicted in the image 205 and in the image 210, the image 220 captured by the user device 105 with the device profile 215 looks similar to the image 210 captured by the second camera 115. For instance, the image 220 is more zoomed in than the image 205, is brighter than the image 205 (e.g., as visible in the reflection of the boat in the water), is less noisy than the image 205 (e.g., has a higher signal-to-noise ratio than the image 205), has a different focus setting than the image 205 (e.g., is focused on the sailboard rather than the water or the horizon), has a different white balance than the image 205, has a different color profile than the image 205 (e.g., the water looks more green or blue than the image 205), or a combination thereof.

Figure 3:
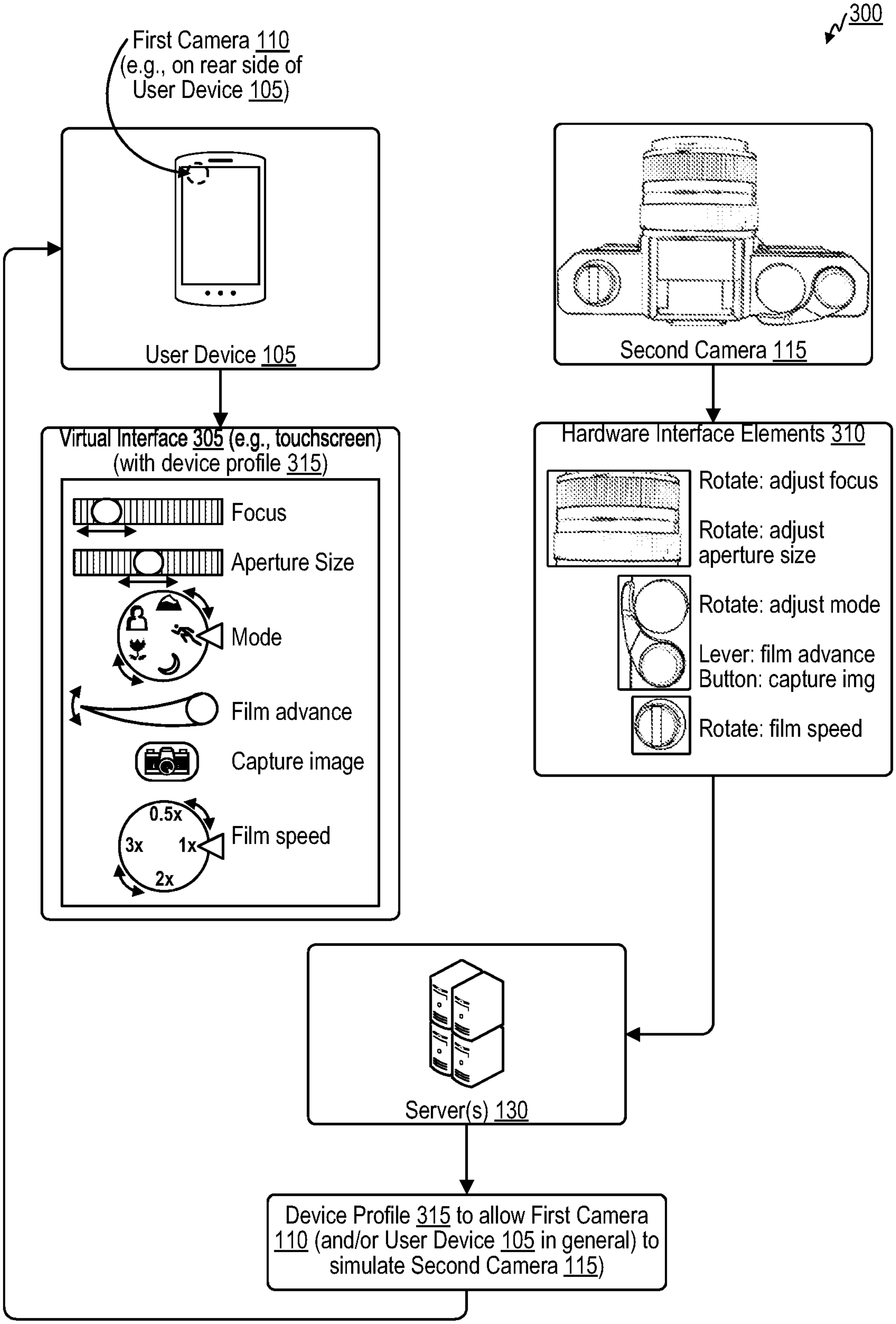
FIG. 3 is a block diagram illustrating examples of hardware interface elements of a second camera that are simulated in a virtual interface of a user device based on a device profile for simulating the second camera, in accordance with some examples.

FIG. 3 is a block diagram 300 illustrating examples of hardware interface elements 310 of a second camera 115 that are simulated in a virtual interface 305 of a user device 105 based on a device profile 315 for simulating the second camera 115. Hardware interface elements 310 can also be referred to as analog interface elements or just interface elements, and can include, for instance, one or more buttons, switches, knobs, rings, dials, sliders, levers, trackpads, or combinations thereof. For instance, in the example illustrated in FIG. 3, the second camera 115 includes a number of hardware interface elements 310, including a ring (e.g., knob, dial) that can be rotated to manually adjust focus, a ring (e.g., knob, dial) that can be rotated to manually adjust aperture size, a knob that can be rotated to adjust mode (e.g., between sport mode, night mode, macro mode, portrait mode, landscape mode, and the like), a lever for advancing film (and/or selecting advancing, reversing, and/or reviewing media such as image(s) and/or video frame(s)), a button for capturing image(s), and a knob for adjusting film speed (e.g., video speed, for instance for slow motion, fast forward, or time lapse). The server(s) 130 can identify, based on the imaging data 125 from the second camera 115 and/or based on the device data 145 from the device data store(s) 165, what hardware interface element(s) 310 the second camera 115 has, what settings each of the hardware interface element(s) 310 are set to (e.g., by default), the ranges of values that each of the hardware interface element(s) 310 are capable of setting a given setting to (e.g., minimum and/or maximum values for each setting), the increments that a given setting can be adjusted by using the hardware interface element(s) 310, or a combination thereof. The server(s) 130 can incorporate this information about the hardware interface elements 310 in the device profile 315.

Once the user device 105 receives the device profile 315, the user device 105 can use the device profile 315 to generate a virtual interface 305 that simulates the hardware interface elements 310 of the second camera 115. For instance, the virtual interface 305 for the user device 105 includes a virtual slider to simulate the ring that adjusts focus in the hardware interface elements 310, a virtual slider to simulate the ring that adjusts aperture size in the hardware interface elements 310, a virtual knob to simulate the knob that adjusts mode in the hardware interface elements 310, a virtual lever to simulate the lever that advances film in the hardware interface elements 310, a virtual button to simulate the button that captures an image in the hardware interface elements 310, and a virtual knob to simulate the knob that adjusts film speed in the hardware interface elements 310. In some examples, the virtual interface 305 may also have text-based inputs, voice or speech based inputs, speech-to-text based inputs, text-to-speech based inputs, gesture-based inputs, or a combination thereof.

In some examples, a camera being simulated via device profile, such as the second camera 115, may be a digital camera. In some examples, a camera being simulated via device profile, such as the second camera 115, may be an analog camera (e.g., capturing image(s) and/or video on analog film rather than as digital files). In such examples, interface elements that perform a specific analog function in the analog camera, such as advancing film (e.g., the film advance lever) or adjusting film speed (e.g., the film speed knob) may perform a digital equivalent or digital simulation of the analog function. For instance, the film advance lever in the virtual interface 305 may advance from one media frame (e.g., image, video frame, depth image or depth map) to the next in a sequence or set of media frames. Similarly, the film speed knob may adjust speed for capture and/or playback of video or other media (e.g., audio), for instance for slow motion, fast forward, time lapse, frame skip, increased frame rate of capture and/or playback, decreased frame rate of capture and/or playback, another adjustment associated with speed of capture and/or playback, or a combination thereof. For instance, the film speeds illustrated in FIG. 3 include a film speed of 0.5× (e.g., half-speed capture and/or playback), 1× (e.g., regular speed capture and/or playback), 2× (e.g., double-speed capture and/or playback), and 3× (e.g., triple speed capture and/or playback).

In some examples, the virtual interface 305 may include a representation (e.g., an image, a three-dimensional (3D) model, or another representation) of at least a portion of the second camera 115. The virtual interface elements of the virtual interface 305 that simulate the various hardware interface elements 305 can be arranged on the representation of the second camera 115 (within the virtual interface 305) in the same way as the various hardware interface elements 305 are actually arranged on the second camera 115. For instance, in an illustrative example, the virtual interface 305 may include a 3D model of the second camera 115 that the user can rotate as they please by interacting with (e.g., swiping across) the touchscreen, to access the various sides and/or orientation of the 3D model of the second camera 115. The 3D model of the second camera 115 can include a representation of the ring for adjusting focus of the hardware interface elements 305 of the second camera 115, and in the virtual interface 305, this representation of the ring for adjusting focus can be rotated via an interaction (e.g., swiping or another gesture) on the touchscreen to act as the virtual interface element corresponding to this hardware interface element, thus adjusting the focus of the first camera 110 in a way that simulates the adjustment of focus of the second camera 115 that would be achieved by rotating the ring in the same manner. Different parts of the 3D model of the second camera 115 can act as virtual interface elements (to adjust settings for the first camera 110 and/or the user device 105) corresponding to each of the hardware interface elements 310, including a representation of the ring for adjusting aperture size that can rotate in the virtual interface 305 to adjust the aperture size of the first camera 110, a representation of the knob for adjusting mode that can rotate in the virtual interface 305 to adjust the mode of the first camera 110 and/or user device 105, a representation of the lever for advancing film that can be moved in the virtual interface 305 to advance film (e.g., advance media frame) for the first camera 110, and/or a representation of the knob for adjusting film speed that can rotate in the virtual interface 305 to adjust the film speed (e.g., video speed or speed of media capture and/or playback) of the first camera 110.

Figure 4:
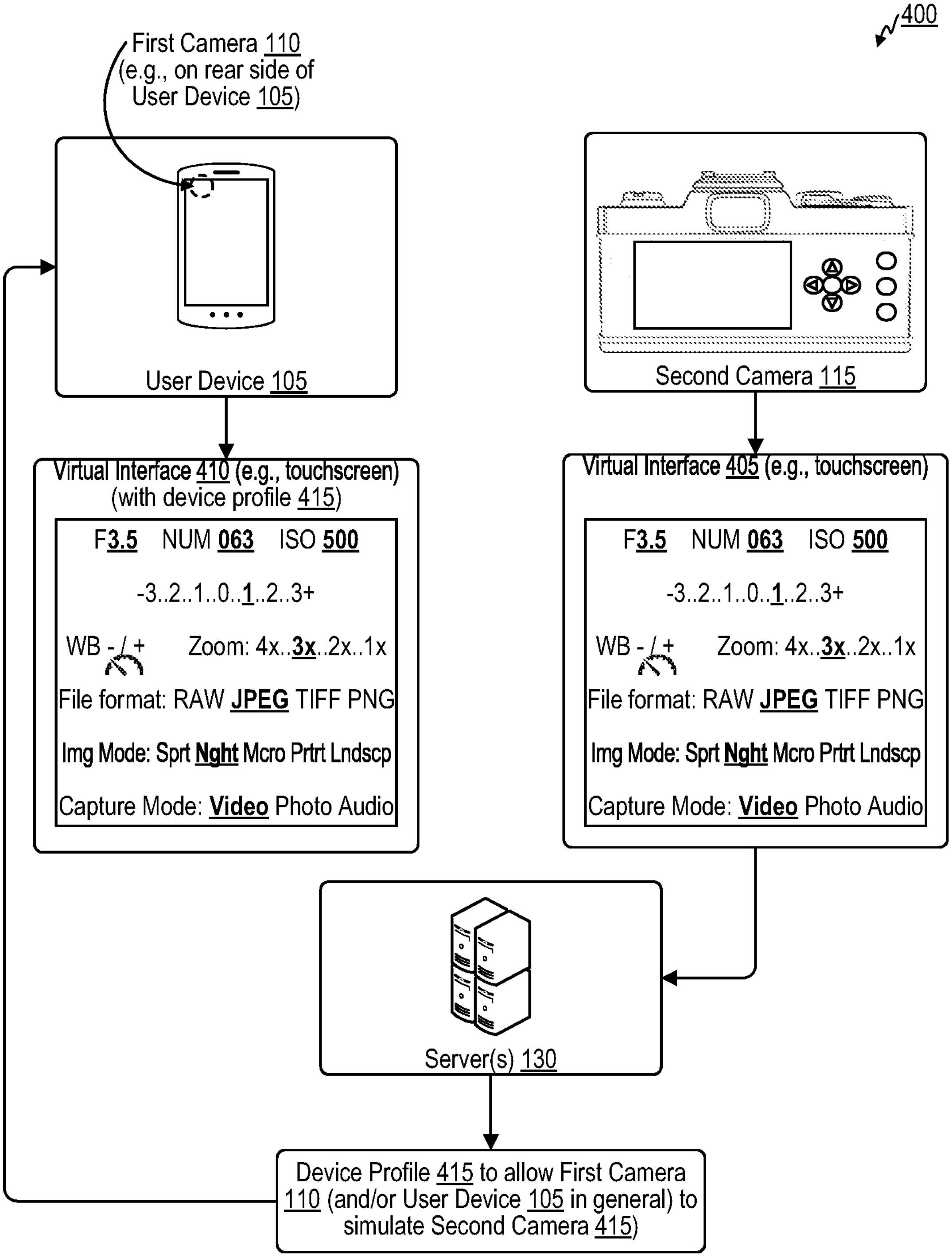
FIG. 4 is a block diagram illustrating examples of a virtual interface of a second camera that is simulated in a virtual interface of a user device based on a device profile for simulating the second camera, in accordance with some examples.

FIG. 4 is a block diagram illustrating examples of a virtual interface 405 of a second camera 115 that is simulated in a virtual interface 410 of a user device 105 based on a device profile 415 for simulating the second camera 115. The virtual interface 405 can be referred to as a digital interface, and can refer to any interface displayed on a display screen of the second camera 115, such as a touchscreen or a screen with button(s) used for selecting displayed options. In some examples, the virtual interface 405 can include virtual buttons, virtual switches, virtual knobs, virtual dials, virtual rings, virtual sliders, virtual levers, virtual trackpads, or combinations thereof.

For instance, in the example illustrated in FIG. 4, the second camera 115 includes a display on a rear surface that displays a virtual interface 405 with various virtual interface elements. The virtual interface 405, for instance, includes virtual selection interfaces for f-stop value (with an f-stop value of 3.5), a frame number (063), an ISO value (500), a focus value (1), a white balance value (indicated by a speedometer icon and – and + virtual buttons), a zoom value (3×), a file format (JPEG), an image mode (night), and a capture more (video).

The server(s) 130 can identify, based on the imaging data 125 from the second camera 115 and/or based on the device data 145 from the device data store(s) 165, what element(s) the virtual interface 405 of the second camera 115 has, what settings each of the element(s) of the virtual interface 405 are set to (e.g., by default), the ranges of values that each of the element(s) of the virtual interface 405 are capable of setting a given setting to (e.g., minimum and/or maximum values for each setting), the increments that a given setting can be adjusted by using the element(s) of the virtual interface 405, or a combination thereof. The server(s) 130 can incorporate this information about the virtual interface 405 in the device profile 415.

Once the user device 105 receives the device profile 415, the user device 105 can use the device profile 415 to generate a virtual interface 410 that simulates the virtual interface 405 of the second camera 115. For instance, as illustrated in FIG. 4, the virtual interface 410 of the user device 105 exactly recreates the virtual interface 405 of the second camera 115. In some examples, the virtual interface 410 of the user device 105 can recreate elements of the virtual interface 405 of the second camera 115, but can rearrange certain elements (e.g., to fit different screen dimensions and/or resolution and/or orientations), to remove certain elements (e.g., to remove a setting that the user device 105 is not capable of, for instance a flash setting if the user device 105 has no light emitter for flash photography), to add certain elements (e.g., to add settings specific to the user device 105 and/or the first camera 110 and/or the hardware interface elements 310 and/or access to sensor(s) and/or mode(s)), or a combination thereof. In some examples, the virtual interface 405 and/or the virtual interface 410 may also have text-based inputs, voice or speech based inputs, speech-to-text based inputs, text-to-speech based inputs, gesture-based inputs, or a combination thereof.

Figure 5:
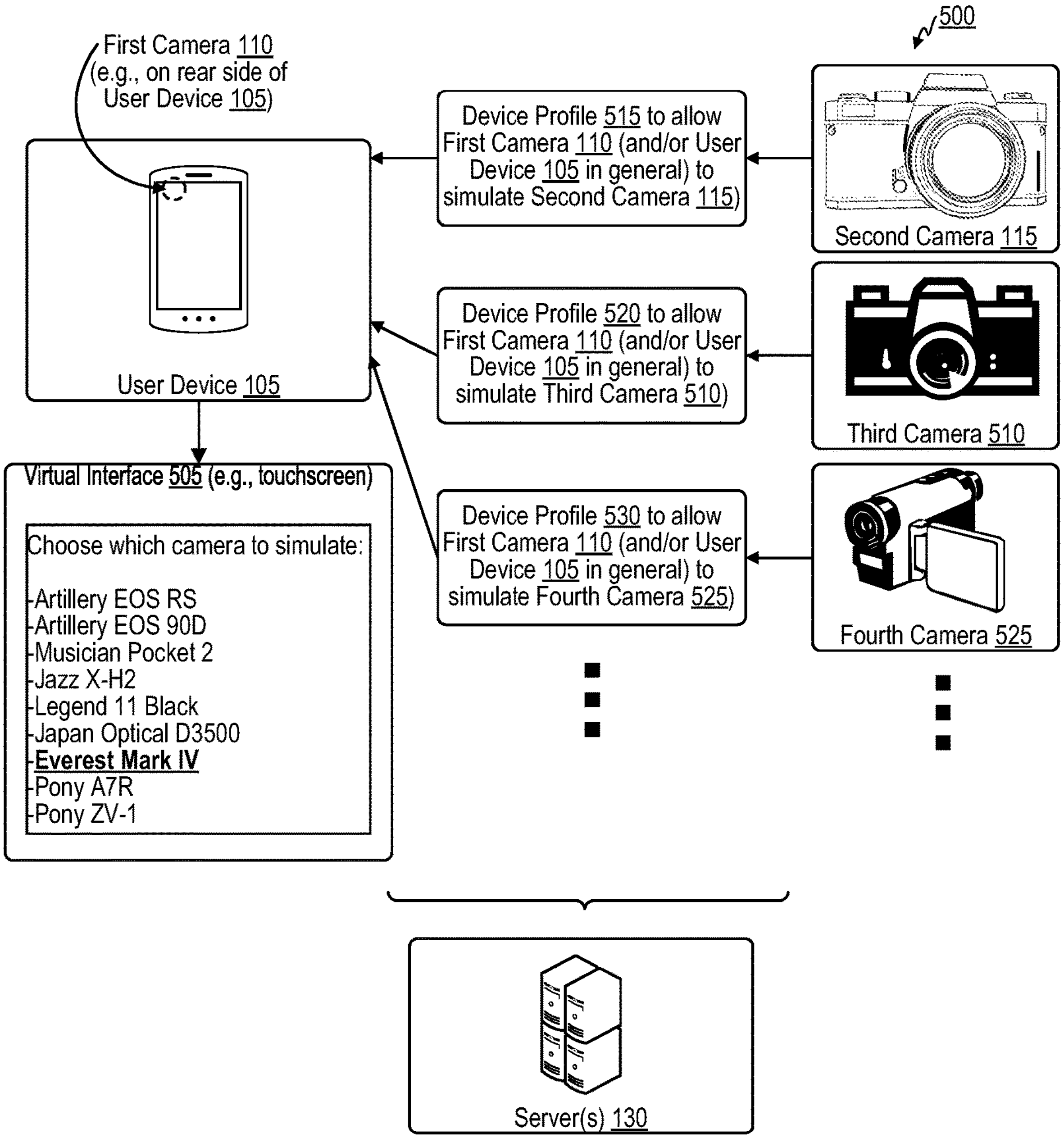
FIG. 5 is a block diagram illustrating an example of a virtual interface for a user device through which one of a set of different cameras can be selected for the first camera of the user device to simulate, with each of the set of different cameras being associated with respective device profile for simulating that camera, in accordance with some examples.

FIG. 5 is a block diagram illustrating an example of a virtual interface 505 for a user device 105 through which one of a set of different cameras (e.g., second camera 115, third camera 510, fourth camera 525) can be selected for the first camera 110 of the user device 105 to simulate, with each of the set of different cameras being associated with respective device profile (e.g., device profile 515, device profile 520, device profile 530) for simulating that camera. For instance, the device profile 515 can be used by the user device 105 to allow the user device 105 (e.g., via the first camera 110) to simulate the second camera 115. The device profile 520 can be used by the user device 105 to allow the user device 105 (e.g., via the first camera 110) to simulate the third camera 510. The device profile 530 can be used by the user device 105 to allow the user device 105 (e.g., via the first camera 110) to simulate the fourth camera 525. The virtual interface 505 lists 9 different cameras that can be selected to be simulated by the user device 105 (using the first camera 110), with "Everest Mark IV" being selected. For instance, if the third camera 510 is the Everest Mark IV, the user device can use the device profile 520 to simulate the third camera 510 (the Everest Mark IV).

The server(s) 130 can generate the device profile 515 for simulating the second camera 115 (e.g., based on device data 145 and/or imaging data 120-125 respectively associated with the second camera 115 and/or the user device 105 as in FIG. 1), the device profile 520 for simulating the third camera 510 (e.g., based on device data and/or imaging data respectively associated with the third camera 510 and/or the user device 105), the device profile 530 for simulating the fourth camera 525 (e.g., based on device data and/or imaging data respectively associated with the third camera 510 and/or the user device 105), and/or further device profile(s) for simulating further media capture device(s).

In some examples, any of the tasks discussed herein as being performed by the server(s) 130 (e.g., in FIGS. 1-5) can instead, or additionally, be performed by the user device 105. For instance, in some examples, the user device 105 generates the device profile (e.g., device profile 140, device profile 215, device profile 315, device profile 415, device profile 515, device profile 520, device profile 530) for the user device 105 to simulate the second camera 115, for instance based on imaging data from the user device 105 (e.g., imaging data 120), imaging data from the second camera 115 (e.g., imaging data 125), device data from device data store(s) 165 (e.g., device data 145), or a combination thereof.

Figure 6:
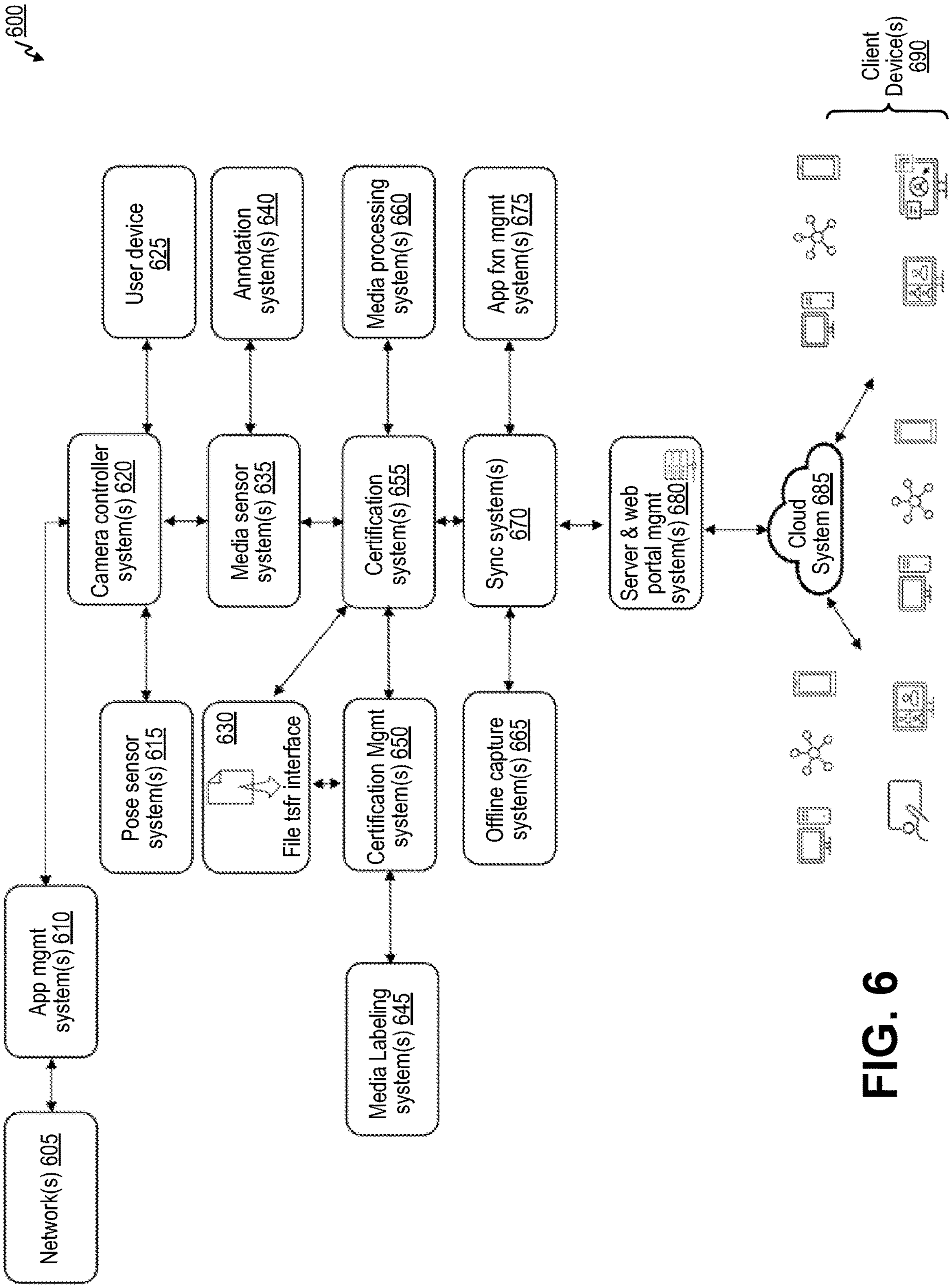
FIG. 6 is a block diagram illustrating an architecture of an imaging system for interfacing between a user device, client device(s), and cloud system(s), in accordance with some examples.

FIG. 6 is a block diagram illustrating an architecture of an imaging system 600 for interfacing between a user device 625, client device(s) 690, and cloud system(s) 685. A user device 625, such as the user device 105, connects to network(s) 605, such as the Internet, for instance to download application(s) from application repositorie(s) (e.g., app stores or other repositories of software application(s)) that the user device 625 manages using application management system(s) 610. The user device 625 includes camera controller system(s) 620, which can control media sensor system(s) 635 (e.g., camera(s), depth sensor(s)) as well as pose sensor system(s) 615 (e.g., positioning receiver(s), accelerometer(s), gyroscope(s), gyrometer(s), inertial measurement unit(s), altimeter(s), barometer(s), compass(es)). The user device 625 can include annotation system(s) 640 that can annotate image(s) or other media with written notes (e.g., which may in some cases be captured via speech-to-text and/or translation(s)), voice notes, captions, notes or annotations drawn on the image or other media (e.g., an object circled or highlighted in a color), or a combination thereof. The user device 625 can include media labeling system(s) 645 that can generate automated labels in the media, for instance labeling media with timestamps (e.g., timestamp of a time and/or date of capture), location of capture, heading or direction of capture, orientation of the camera during capture, elevation or altitude at capture, type of media (e.g., image or video), category or group of media (e.g., which room was it captured in, is the subject a person or a landscape or a structure, etc.), any tags for the media for search purposes may be structured for use in AI systems, any annotations made to the media, a caption for the media, mapping data indicating where the media was captured including image azimuthal positioned on a horizontal map or vertical street scene, an indication of zoom status, an indication of what any of the image capture settings discussed herein were set to during capture of the media, an indication of what any of the image processing settings discussed herein were set to for processing the media, or a combination thereof.

Figure 9:
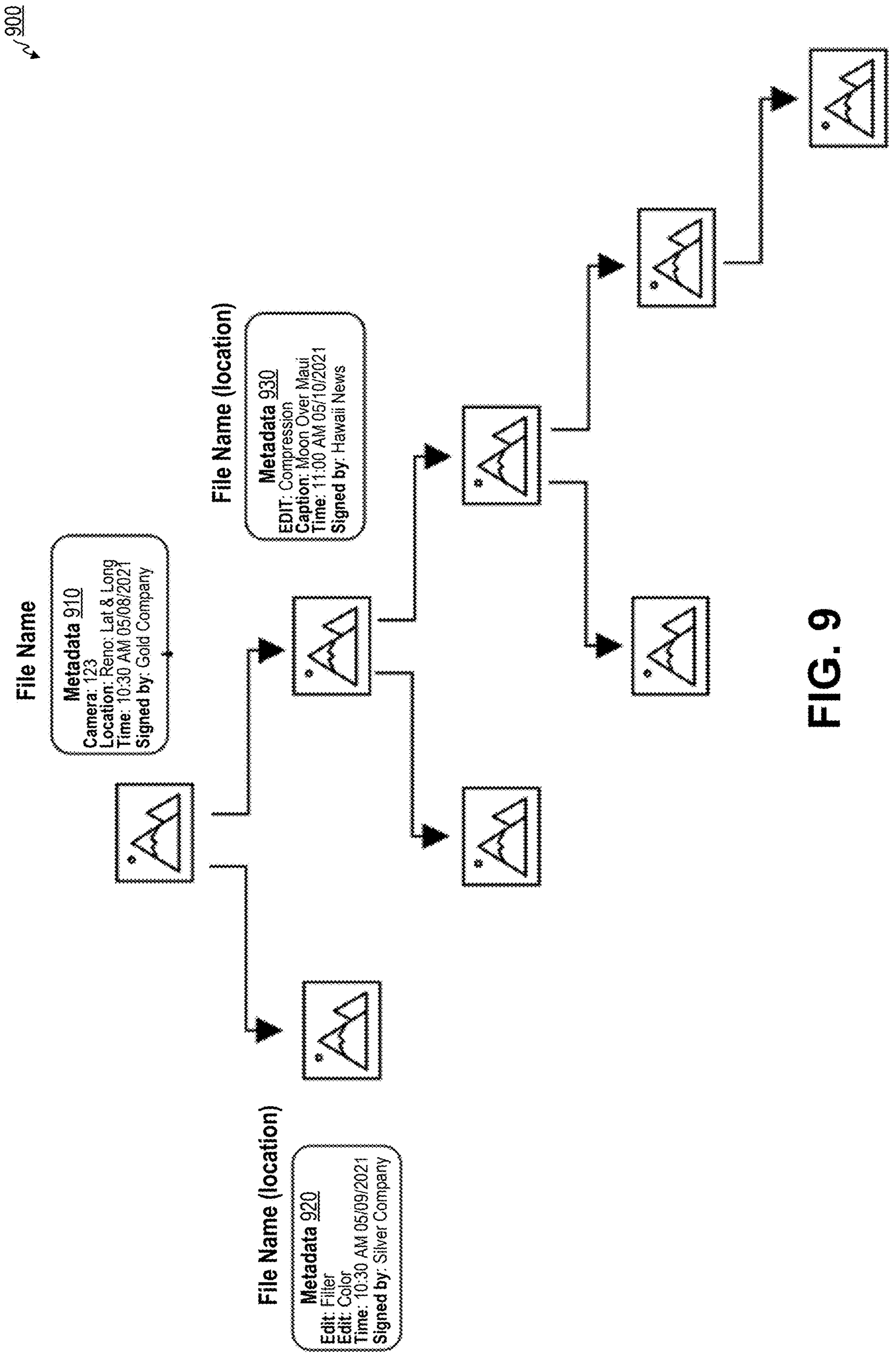
FIG. 9 is a conceptual diagram illustrating a hierarchical media and metadata tree, with media changes and history documented and displayed in accordance with some examples.
Figure 10:
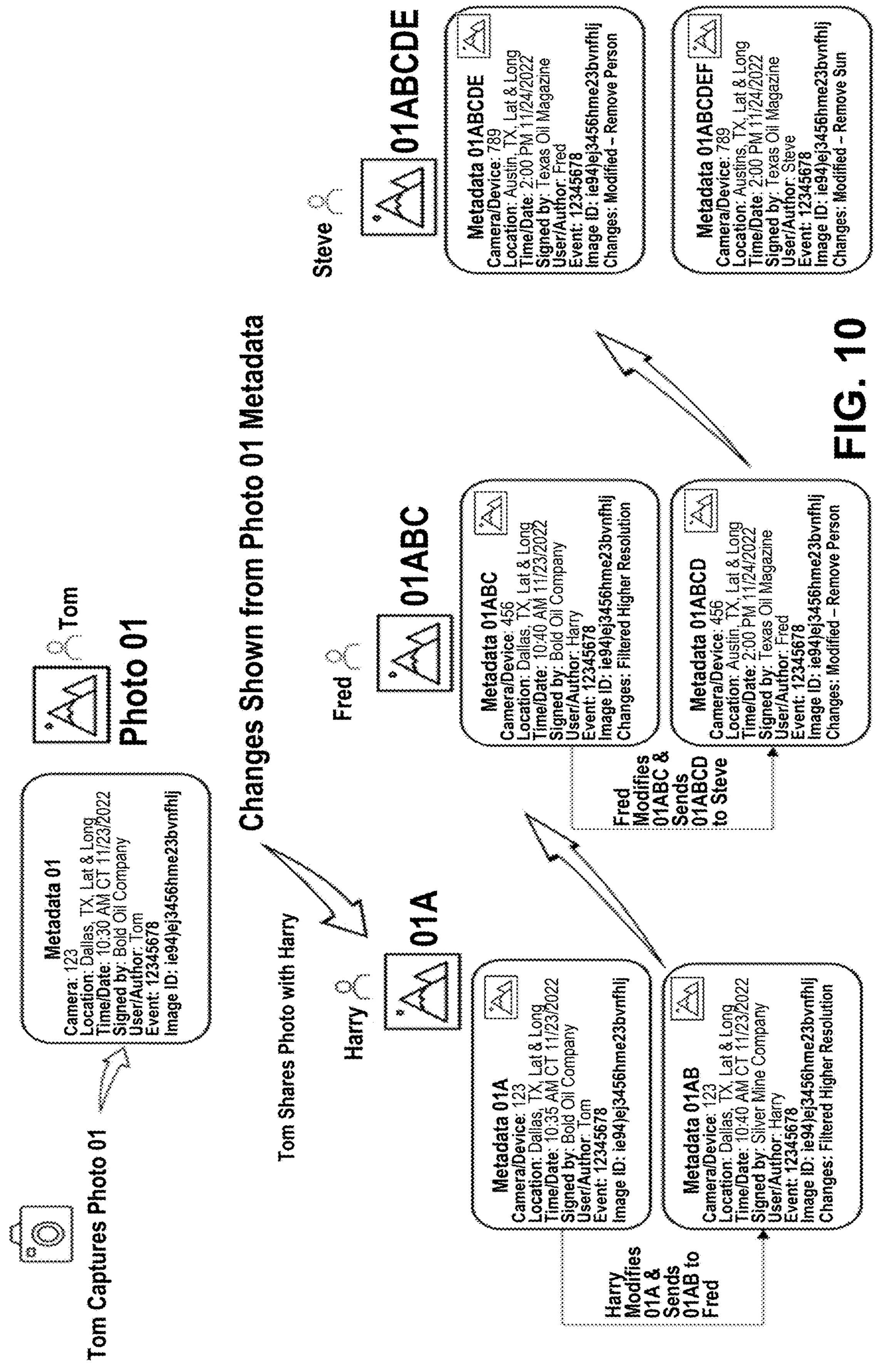
FIG. 10 is a conceptual diagram illustrating an example of a media lifecycle evolution and detailed media and history of changes recorded in metadata, in accordance with some examples.

The user device 625 can include certification system(s) 655 that can certify media, certify label(s) and/or annotation(s) to the media, certify edit(s) to the media, certify chain of custody over the media, and the like, for instance as illustrated in FIGS. 9, 10, and/or 11. Certification management system(s) 650 can be used to verify content authenticity and/or authenticate certification of certain images, video, media, annotations, labels, edits, chain of custody, and the like. In some examples, verification that a certified element (e.g., a media asset, an annotation, an edit, or some other certified element) is valid and unchanged relative to its certification, includes checking to see if a hash of the certified element matches a hash stored in an encrypted signature of the certified element (e.g., that was encrypted using a private key at a time during or immediately following creation of the certified element), the encrypted signature being decrypted (e.g., using a public key) in order to extract the hash for verification. In some examples, verification of a certified element can also include analysis of the certified element using an artificial intelligence system, such as a trained machine learning model that is trained to identify media that has been tampered with while on the capture device or during media analysis during the media lifecycle.

The user device 625 can include synchronization system(s) 670 that can transfer the certified media, along with annotations, labels, social media users, or site(s) and/or app(s) in use, and/or other data to the server(s) of the cloud system 685. The synchronization system(s) 670 can keep all of this data synchronized between the user device 625 and the server(s) of the cloud system 685. The user device 625 can include offline capture system(s) 665 that can keep media and/or related data safe (e.g., encrypted) until the user device 625 connects to a network, at which point the offline capture system(s) 665 can use the synchronization system(s) 670 to transfer the media and/or related data to the cloud system 685. Application function management system(s) 675 can further manage other function(s) of the user device 625.

Server and web portal management system(s) 680 of the cloud system 685 can manage the transfer and/or synchronization of media and/or other data with the user device 625. Server and web portal management system(s) 680 of the cloud system 685 can also manage maintenance of web portal(s) and/or application(s) and/or tool(s) through which client device(s) 690 can access certified media uploaded from the user device 625 to the cloud system 685.

In some examples, device profiles (e.g., device profile 140, device profile 215, device profile 315, device profile 415, device profile 515, device profile 520, device profile 530) that allow one device to simulate another device can be among the data that is generated and/or certified by the user device 625 and/or the cloud system 685, and/or that may be stored in the cloud system 685 for distribution to client device(s) 690 that can use the device profile(s) to simulate another device (e.g., to simulate the user device 625). In some examples, the cloud system(s) 685 can receive information from the user device 625 and/or the client device(s)

690, such as imaging information (e.g., imaging data 120, imaging data 125) to generate device profiles.

In some examples, media can be authenticated (e.g., using the certification system(s) 655 and/or the certification management system(s) 650) using trust zones. Trust zones can be provided in any combination between the camera sensor(s), a secure digital channel, memory and/or processor(s) across secure and/or non-secure areas of the user device 625, either by programmable protection bits that can be allocated to areas of a secure, isolated processor, memory or storage as determined or programmable region value used by trust zone like splitting the RAM into two regions with bi-directional API communication back and forth between the two, one secure and one non-secure. Splitting of memory to create trust zone(s) can be accomplished by read and write transactions between the media asset capture and frame processing isolated in the rich execution environment (REE) read only (RO) frame buffer access processes, including verifying hashing, digital signatures, and/or RO frame access. Authentication of data, media, and/or metadata can be accomplished, for instance via control over camera(s), sensor(s), central device processor(s), and/or external communication(s) of the user device 625. This type of access to the user device 625 for the authentication verification process can be undertaken on the electronic device or in and embedded computer processor as an element of the host device to prove the provenance of a media of any type, including images, videos, audio, depth data, and/or any other type of media discussed herein. This programmable flexibility enables the reuse of a single design for different applications at different times.

In some examples, digital media can be captured using sensors and integrated with AI-created data into or with media or merged to form an AI image using generative AI tools to create AI-generated false or misleading media. The certification system(s) 655 and/or certification management system(s) 650, including associated verification system(s) can detect media manipulation by humans, machines, and those generated by AI systems. In some examples, the certification system(s) 655 and/or the certification management system(s) 650 can notify/alert, watermark, or labeled materials as AI Generated and identify and/or incorporate the source, GPS location accuracy, author, device, user, originator, copyright, or a combination thereof. In some examples, Using multiple collaborative onboard sensors in a standalone or user-selectable amalgamated process, such as tools including algorithms, metadata, positional and gyroscopic tools, accelerometers, location sensors, lidar, multispectral sensors, pixel data, camera position/orientations along with original media history details, can form a system to determine, verification that AI was used to generate or process or included as parts of a media file and thereby using a selection of tools to assess originality by sensor, human involvement, machine created or AI.

In some examples, device profiles can translate existing digital camera models software (OS) Operating Systems converted into a software module that is downloadable in an application form as a digital camera emulator or simulator. The device profiles can simulate, emulate, and/or mimic the reproduction of a specific make and model of the digital camera. The simulated camera can be, for instance, transformed into a computer software application to be delivered via a software repository (e.g., an app store) and downloaded to a digital device host such as a touchscreen-equipped smartphone, tablet, wearable, watch, glasses, body camera, drone, electronic device. The camera apps can also be downloaded on a web browser to turn any computer or software image generation system into the digital camera model chosen to download. The computer screen can graphically display a digital camera overall, with the camera back with a 3D camera viewable, with touch screen tools to select, move around the screen to view front, side, top, controls and the viewport screen to control camera features and functions anywhere on the virtual camera using familiar typical digital camera controls, including a media trigger button with all other operational modes, features, and functions required to operate with touchscreen controls identical to the physical camera including all verification features and process to determine media authenticity. In some examples, to determine media authenticity, the certification system(s) 655 and/or the certification management system(s) 650 can include interfaces to generative AI image-generating tools, websites, applications, and/or systems to track original AI generated media via certified media on a device. In some examples, the certification system(s) 655 and/or the certification management system(s) 650 can check the metadata/technical camera data and verify what is real vs what was created by AI and what was created by the camera that can be identified and verified as original. The computer can be unitized to control and operate a remote, any digital image camera or sensor such as a doorbell, dental, body camera, security camera, dash camera, satellite phone media camera-equipped, medical, surgery, surveillance, or drone camera or sensors. Using machine learning algorithms and/or artificial intelligence, digital cameras can incorporate more special tools in smaller spaces, improving cameras of smaller devices (e.g., phones or other mobile handsets) by, for instance simulating a large, weighty, heavy, power-hungry, and expensive DSLR camera. Simulation of such devices using associated device profiles can produce similar media (e.g., images, videos)

In some examples, an application running of a user device that uses a device profile can simulate or mimic the features and functions of a specific make and model of camera. In some examples, the application for the user device, using the device profile for simulating a specific, can give the user device access to the same features and functions as the specific camera being simulated. In some examples, the device profile can include, or be based on, data from the manufacturer. In some examples, the device profile (and/or the associated application) can be updated as data about the specific camera (e.g., from the manufacturer) is updated (e.g., regarding a new hardware revision, a software update to the camera being simulated, or the like). In some examples, elements of the camera being simulated are replaced; for instance, the viewfinder of a DSLR camera being simulated by the user device 105 can be replaced by a viewport (e.g., preview image on the display) of the user device 105. In some examples, the user device 105 has on/off controls and touchscreen control buttons when the menu button is touched. Presets can be dialed into the camera controller system(s) 620 and viewable on the viewport as a preset is selected for a scene by a touchscreen, speech, eye tracking or gesture control, ISO, depth of field, F stops, lighting effects such as day or night, high-speed action capture, lens selection, etc. The touchscreen control can have sliders or other virtual interface elements for telephoto lens control, two-step touch control button detents for focus (first detent), and a deeper or more pressure capture (second detent), including autofocus, white balance, flash, image file format selection (e.g., JPEG, HEIF, RAW) as examples image file formats. In some examples, touchscreen controls provide media capture review, feedback, or playback of video. In some examples, interchangeable lenses of the simulated camera (e.g., second camera 115) can be handled via software that simulates each of the interchangeable lenses, and allows a user to select which of the interchangeable lenses to use, for instance between 20 mm-200 mm lenses. In some examples, third-party lens mechanical products can be mounted to the user device 105 to assist with the user device 105 simulating the second camera 115, for instance with the user device 105 instructing the user to mount a lens product over the first camera 110.

In some examples, the user device 105 can integrate other media features and functions, such as capturing standard or authenticated media, adding visual and/or non visual glyphs, digital signatures, and watermarks to media at capture, and transmitting and/or streaming and bidirectional synchronizing multiple media types to the cloud or mobile camera system. The system can meet certification, authentication, analysis, provenance, authentication, and verification requirements before, during, and after media is captured and stored in a secure chain of custody that continues throughout the life of the media. As the media is used, shared, sent, transferred, repositioned, edited, and changed, the system can verify the original and subsequent changes made by various users and record those changes in the media metadata and a media analyst system. When interrogated by the system, the verification and analysis system creates an audit computer record and history tree map of each transaction. It provides a pointer to the last media record created and the current location.

A virtual camera may refer to a simulated camera that is simulated on a host device (e.g., user device 105) using a device profile as discussed herein. In some examples, a virtual camera may be simulated using software (which may be referred to as virtual software or virtualization software or simulation software) to mimic or simulate a specific digital camera device (e.g., a specific brand and/or model of a digital camera) by changing capture setting(s) for image capture and/or processing setting(s) for image processing in the host device, without changing any hardware component of the host device. It also utilizes the host's camera controller, which may be separate from the standard smartphone camera or operate in conjunction.

Various features can be made available through the user interface via the virtual camera application, such as an AI processing module, AI capture controls, APIs, image processors, built-in camera stabilization for still and active video movie shooting, autofocus, and real-time autofocus tracking, high resolution video (e.g, 4K, 8K, 24p, 50p, 60p), image sensors (e.g., complementary metal-oxide-semiconductor (CMOS), 35 mm), preview images, support for lossless RAW image format, support for other image format(s) (e.g., including Joint Photographic Experts Group (JPEG), Tag Image File Format (TIFF), Portable Network Graphics (PNG), Graphics Interchange Format (GIF), High Efficiency Image File Format (HEIF)), operator-selectable pixel count and/or resolution, exposure and color algorithm controls, focus priority for low light media capture, auto shoot sequence modes selectable by user, shutter modes (e.g., global shutter mode, rolling shutter mode) selectable, shooting of continuous images, shooting images in user established selectable events or incidents having a title, date, time, location, user, device, category, image counter displaying the number of media and type, gamut settings, adding media labels, media descriptions, notes, identifiers via text of by text to speech, pre-determined selectable titles, or annotations to media (e.g., location, time, date, time zone, 12 hour/24 hour clock, author, photographer, user, device, model, and/or tracking data), satellite interfaces, gimble mount to remove vibration, mechanical lens mount(s) for use of additional lens types, flash modes support, remote broadcasting or synchronizing the camera controls, or a combination thereof.

In an illustrative example, a user can open settings and register on their user device. The user allows the downloaded camera app and access to the user's digital device owner's normal camera functions, menus and features, such as the photo library, and if required, a separate camera control unit provided by the new app that can take over controls of digital camera application and installation on the host digital device. The controller can control all the camera's multiple camera sensors, allowing access to the system used in the manufacturer's camera preset for the downloaded camera model. Users choose the camera's photo and video resolutions, watermarks, digital signature use, and color and choose to embed QR codes on media at capture or integrate a copyright ownership statement, user, device, or photographer name in the image metadata file. They can also decide to accept geotag media location, choose media author, and select to install timestamps, times, dates, locations, notes, media IDs, orientations, and labels on media. They can include specific preset, automated, or custom media IDs on all media types, synchronize media, upload on WIFI, and view onboard tools to see the preview media before keeping the capture, and finally, with transmission or synchronization of the media to the cloud for storage, preservation, and use automatically. The user can also upload media, choose to send a copy to the camera roll if desired, or third party and choose to include the author and copyright on the or other data on or with the media to include content authenticity, provenance data, verification information, or further media details.

In some examples, presets are used in dedicated digital cameras. These presets are built in the form of a software library. They can be transferred into a virtual digital camera application where they can be transferred to a different digital platform and used as they would typically be used. Machine learning can also determine, simulate, emulate, and/or mimic such presets and/or controls.

In some examples, profiled cameras are evaluated by several factors, including sensitivity, shutter speed, aperture with various lens configurations, color gamma, and sensor noise, to name a few. These measurements and more will form the basis of the camera profile table. Select values are used to set up and align the smartphone's camera controller settings before capturing an image or video. Other table values are utilized post-capture to adjust for color gamma, noise, color temperature, saturation, contrast, etc. Most profiled cameras feature various modes specific to that camera, such as automatic, action, low light, macro, landscape, sports mode, portrait mode, night mode, and various other preset modes. The image capture settings, image processing settings, and/or imaging characteristics of each of these modes can be analyzed and/or evaluated, and each of these modes can be made available to the smartphone user to select to emulate, simulate, and/or mimic use of each of these modes.

Figure 7:
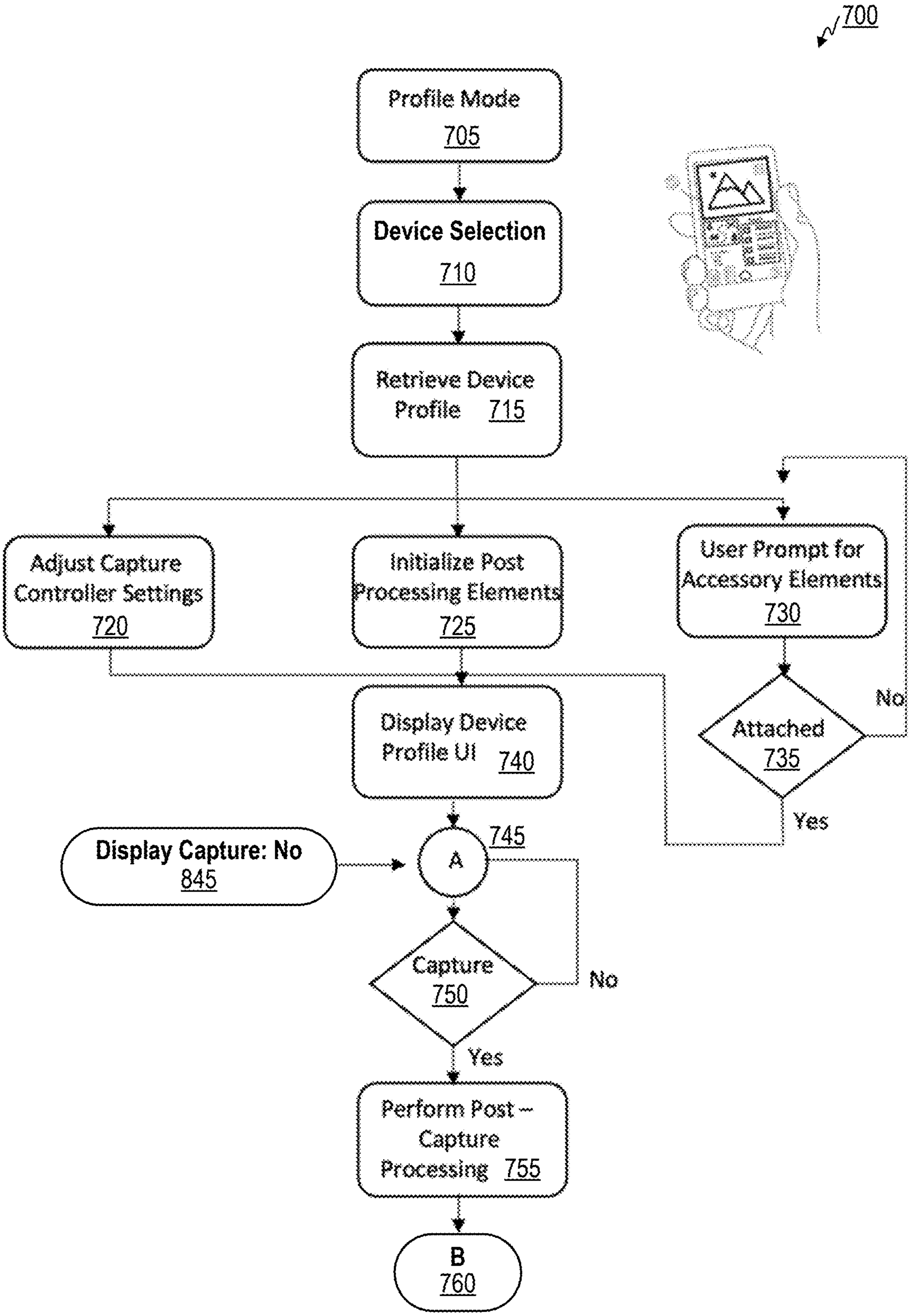
FIG. 7 is a flow diagram illustrating a first part of a process for imaging, in accordance with some examples.
Figure 8:
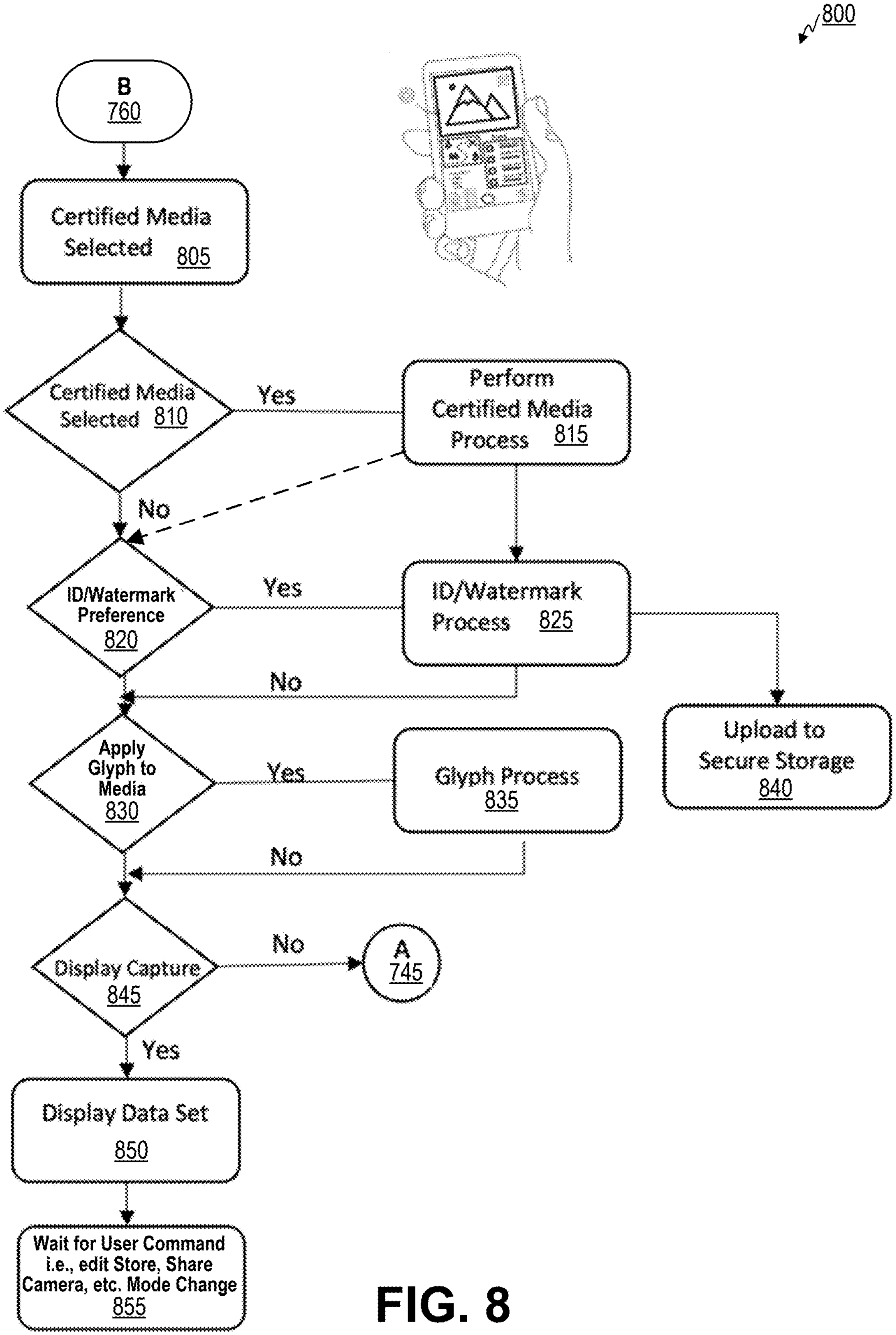
FIG. 8 is a flow diagram illustrating a second part of the process for imaging of FIG. 7, in accordance with some examples.

In some examples, host devices or user devices (that can simulate other cameras), and/or the cameras being simulated, can each include, for instance, phones, tablets, mobile handsets, digital cameras, analog cameras, SLRs, DSLRs, home security cameras, doorbell cameras, body cameras, video game console cameras, autonomous automobile cameras, computers, tablets, wearables, glasses, drones, webcams, semiconductor chips or chipsets that include a trusted execution environment that is part of the camera subsystem, virtual reality (VR) headsets, augmented reality (AR) headsets, mixed reality (MR) headsets, extended reality (XR) headsets, social media systems, any other types of cameras or media capture devices discussed herein, or combinations thereof FIG. 7 is a flow diagram 700 illustrating a first part of a process for imaging. FIG. 8 is a flow diagram 800 illustrating a second part of the process for imaging of FIG. 7.

As shown in the flow diagrams of FIG. 7 and FIG. 8, in operation 705, a user can make a profile mode selection on a user device's user interface (UI). At operation 710, the a device selection is made, selecting which camera or other device is to be simulated on the user device, as in the virtual interface 505. At operation 715, a device profile is retrieved for the selected device. At operation 720, the user interface for the user device identifies image capture settings to be used to simulate the other device based on the device profile, and in some cases also allows the user (e.g., via an interactive portion of the interface) to adjust image capture settings, for instance providing menu options such as 'Menu,' 'Action,' 'Macro,' 'Zoom,' 'Landscape,' Low Light,' shutter speed, aperture, flash, other image capture settings discussed herein, or a combination thereof.

At operation 725 the type(s) of post-processing operations that will be performed (e.g., to simulate the other camera or other device based on the device profile) on the image or media captured are listed, and in some cases further options for image processing can be provided in an interactive portion of the interface for selection by the user. Types of post-processing functions that can be performed include but are not limited to, color gamma, sensor noise reduction, motion reduction, facial recognition, watermarking, location, elevation, compass heading, glyph placement, groups, image format selection, photo/video resolutions, other image processing functions discussed herein, or combinations thereof.

At operation 730, the user device can prompt the user to take specific actions to attach specific external accessories or peripherals such as external lenses, sensors, flash, and more. The user device can check, at operation 735, whether the external devices were attached or not. If not, operation 735 can be followed by operation 735. If so, operation 735 can be followed by any of operations 715, 720, 725, or 740.

At operation 740, the user device can show a device profile user interface that simulates user interface(s) (e.g., hardware user interface(s) and/or virtual user interface(s)) of the camera or device being simulated. For instance, the virtual interface 305 of the user device 105 that simulates the hardware interface elements 310 of the second camera 115 can be an example of the device profile user interface. Similarly, the virtual interface 410 of the user device 105 that simulates the virtual interface 405 of the second camera 115 can be an example of the device profile user interface. The device profile user interface can resemble, simulate, emulate, and/or mimic interface element(s) of the camera or device being simulated using the device profile.

An element 745 (labeled "A") represents a point at which the process illustrated by the flow diagram 800 of FIG. 8 can return to the process illustrated by the flow diagram 700 of FIG. 7.

At operation 750, the host mobile digital device in 'profile mode' is waiting for the user to initiate an image or media capture. The image capture settings discussed in operation 720 may already be set at this point, so that the image capture settings are in place once capture is initiated. Once capture is performed, at operation 755, the image or media data set is subjected to the various post-processing functions, in some cases using some of the post-processing elements previously described in operation 725.

An element 760 (labeled "B") represents a point at which the process illustrated by the flow diagram 700 of FIG. 7 transitions to the process illustrated by the flow diagram 800 of FIG. 8.

In some examples, options are made available in a user interface for certified media, content authentication, and embedding of a quick response (QR) code or other glyph/or icon. For instance, option(s) can be selected, pressed, scanned, or activated on the electronic user device or website. In some examples, a visually encoded link can be displayed for scanning, the link leading to a web page with more information about the media's origin, authenticity, interactions, chain of custody, media history, and the like. In some examples, the web page can include certification information and/or interactive elements that allow comments, annotations, edits, sharing, and the like). A process for certifying media is described further with respect to FIG. 11. In general, secure, tamper-evident media is created that is easily authenticated and offers definitive provenance and a reliable chain of custody. At operations 805 and 810, the user device determines if the user chose to certify the captured media. If so, at operation 815, the user device performs the certified media process (e.g., s in FIG. 11) to certify the media.

Users can configure watermarks, digital signature(s), and/or glyphs, for media identification and/or verification or a selectable combination and, if elected, certified media authentication and/or validation. At operation 820, the user device determines if a watermark or other identifier is to be applied. If so, at operation 825, the user device performs the creation and placement of the watermark, digital signature, and/or glyph, to be embedded into the media file. If certified media was created, operation 840 securely automatically transmits it to a secure server system, such as a cloud system and/or a secure storage system.

If, at operation 830, the user applies an optical glyph (e.g., QR code) to the media (e.g., the glyph encoding metadata and/or link(s) to an interactive webpage(s) with more information about the media and/or its metadata), then in operation 835 a glyph process can generate and apply the glyph to the media or embed into the media or metadata.

At operation 845, the user device determines if the user elects to display the captured image, for instance also allowing the user device to verify the certification of the digital media and/or metadata. If not, the host mobile digital device in 'profile mode' returns to element 745 of FIG. 7 and waits until the user initiates an image or media capture. If, at operation 845, the user wishes to view the captured media (e.g., image or video), then at operation 850, the user device displays the captured media. At operation 855, the process then waits until a new user command is initiated, such as edit, share, share to social media, verify, authenticate, camera, photo roll, text, send SMS, another process discussed herein, or a combination thereof.

FIG. 9 is a conceptual diagram 900 illustrating a hierarchical media and metadata tree, with media changes and history documented and displayed. The conceptual diagram 900 of FIG. 9 illustrates digital camera's media chain of custody system and data examples with a recording of each of the specific changes made to a media type being used and documented/recorded in the software and media's metadata file history, including detailed metadata changed from the how the media was received by the current computer/machine/user such as time, date, author, geographic location, filter types used to modify, down to single pixel changes, a device that was used, current digital storage location, the software version of the product used to make a change, i.e., Photoshop, etc., global history record, timeline, provenance information, watermark changes, glyph changes, a record of all digital signing documented throughout a media asset's lifecycle and lifetime. The conceptual diagram 900 includes an overview of the certification processes, resultant details, and/or chain of custody system and glyphs (e.g., QR code and/or barcode) system. Capturing metadata of users beyond chain of custody (COC) with further verification and analysis of subsequent media changes (these changes can be auditable, trackable, tracked or otherwise verified during a verification process for verifying authenticity & recording metadata changes and tracking locations, users and changes.

Viewable data associated with a media asset can include, time, date, time zone, latitude, longitude, camera heading, compass details, altitude, orientation, and odometry data with media ID, and the like. The tree structure of the diagram 900 documents media lifecycle changes ongoing after media capture changes, analyzing, storing change parameters, processing for changes in photos, displaying, and alerting media metadata changes to media metadata. Each media using media analysis tools verifying digital signature and any changes, pixel variation, metadata change, geospatial change, user change, device change, location change, download, and copyright. The tree map shows an image parent with file name/metadata details/Exif change from original, including time/date/change or changes, descriptions, notes, digital signature, linage, owner, creator, author, credentials and child with file name/metadata details/Exif change from original including time/date/change or changes, descriptions, notes, digital signature, linage, owner, creator, author, credentials, relationship, or a combination thereof.

The conceptual diagram 900 illustrates the media certification & verification analysis system process from original media capture (top) though the verification system and metadata changes identified, documented and/or graphically mapped media identifying the changes in metadata and reported. The media sensors captures the original subject, including the who/author/photographer specifically took the media, where it was taken, how it was taken, and when it was taken, on a capture device incorporating instant verification technology and creates the original media in a chain of custody that is stored in the cloud repository along with the captured media metadata that includes many other details not currently captured in standard digital cameras, including a media ID, geo-location, time, date, compass, elevation, tracking, acceleration, camera orientation, software, verification, authentication, network by-directional media and communication devices, cloud interactions, QR codes to name a few. Any media adjustments/modifications, changes, orientation, heading, roll, pitch, yaw, distance to and from subject and computer screens to perform plainer testing, filters, users, geodata, location, devices, and computers can be located in the metadata and viewed by selecting the [(information button/icon/link-metadata viewing of content credentials] button identifier at each electronic location on the digital media assets journey and lifecycle, creating and displaying and comparing the original digital media assets with individual change details made by others who have accessed or have touched a digital media asset (such as time, date, location, user, device, author, change, filter, software type/version used, and tree map block as the media file transiting from user to user or blindly making its rounds on the internet is downloaded by a user who manipulates the media file for use. The Media Authenticate and Analysis step can identify any changes made, including to at least one manipulated pixel of the original media or document and document those in the change panel associated with the media file, and show the changes both visually, by a tree map with history and step by step changed diagnostic reported on each change by image, by a computer process, an AI process, a neural network process, and in a metadata change report.

In some examples, as an original media is captured and travels along its path in a digital custody chain, the historic metadata is continually being captured and subsequently captured and attached to the last metadata and referenced as it is passed to the next user via text, social media, or other electronic means. The conceptual diagram 900 can represent a mobile app capturing digital media metadata, media, technical data/Exif data and metadata in portrait and landscape mode. It also shows the device verification tool where media can be verified on the device at any time. The media is transmitted or synchronized to the cloud system in communication with a web portal and verification system, where the media can be interrogated.

Further, the media can be transferred to other users who may modify the media, which changes the media. Upon further verification, the tracking of changes is stored so later verification checks can be made. For instance, a specific user can change the metadata and the change can be verified against the original media/metadata/Exif/technical data via certification. The changes can be highlighted, for instance showing the original and changes made from the original in a history tree map. In some examples, the map can further identify specific pixels that were changed in edits. Thus, the entire genealogy of a given media can be shown.

The systems and methods described herein may include systems for Media Certification, Chain of Custody, Verification, Authentication, and Changes to Media Tracking. A global media certification authentication system allows users to verify the authenticity of the captured media on the digital device instantly or later on a website using verification, authentication, and verification tools. It also allows the users to review digital media metadata, the media, digital signature, hash, watermark metadata, Exif, technical data, location, pixel variation and other media file information and create a complete history of change and audit log, record each distinct change made by time, user, device, AI and by whom and when, what computer, and what location, and generate an image diary audit trail of each digital type media throughout its lifecycle. An AI system can use computer vision technologies to capture image media information to classify, organize, and create media descriptions from their title, notes, identifier, date, location, media subject, category, metadata, verification status, media objects, access to read glyph, media ID or image vision and utilize in the system.

Beyond the original multiple verifications, authentication, and provenance proof generated for media at capture, the application-integrated verification tools or web verification tools allow the captured media to be verified and authenticated. The resulting verification analysis provides a work breakdown structure of the media's history and displays it. The media can travel through multiple users and be used anywhere. Later, a user can insert the media into the verification tools. The system will build and document the metadata changes in a media map made by all the users and create a report and visual evidence of any changes located, as seen below. The tree in the conceptual diagram 900 illustrates the original media with a metadata file 910, indicating the camera type/model/user/location that took the media, the time/and the date, and that Gold company digitally signed it. So that shows and demonstrates with the original image. Next, under metadata 920 indicates a filter was used and edited the color at 10:30 am on May 9, 2021 and was digitally signed by the Silver Company. In addition, metadata 930 completed a compression, changed the caption to a moon of Maui at 11:00 am on May 10, 2021, and showed Hawaii News digitally signed it. This digital media history tree illustrates the progress as an image passes through different users and how the data is captured in the metadata, can be interrogated at any time during the media lifecycle, for instance including viewing and verifying the original media by scanning the QR code, and can have a pointer to the most current users with a URL address.

The conceptual diagram 900 is an illustration of a hierarchical media metadata chronological tree map detail. Changes are recorded for each media as it passes from user to user or location to location metadata capturing and recording time, date, user, device, model, title, computer, IP address by time, date, location, connection, time, documenting each changes to media, including a new digital signature, watermark, hash or some combination of each, pixels, format, changes, such as time, date changes made by identified users, computer systems, filters, software programs, and screen captures. Other changes made by texting, social media users, sending, transferring, emailing, or otherwise transferring. As media pass from user to user during the media's life, the metadata changes are created and recorded, adding each continuing change and documenting all changes made by any user or devices and recorded into both a textual description along with a tree mapping each prior, current change made to the media. The system creates a parent-child type genealogy software metadata file with the latest identify the last user address and electronic location in which it resides. This visual example is used to illustrate the process.

FIG. 10 is a conceptual diagram 1000 illustrating an example of a media lifecycle evolution and detailed media and history of changes recorded in metadata. The conceptual diagram 1000 illustrates the authentication and media and metadata information documented by the original media capture verification system for O1 photo. The details describe each media metadata in the block showing the camera id, the location, time/date/zone, digitally signed by, user, author, event, and image id. Below the O1 photo, metadata are boxes showing and containing the digital content of the photo and the asset metadata, which are incorporated as part of the overall photo metadata along with and including the digital content (e.g., technical metadata and the asset metadata (e.g., non-technical metadata)).

The conceptual diagram 1000 of FIG. 10 further illustrates an example of an evolution of the captured photo. Continuing the Example of an Evolution Use Journey of Photo 01, in the conceptual diagram 1000, Tom shares Photo 01 with Harry via texting, and it now becomes Photo 01A, Complete with metadata from the last user changes by Tom. Harry makes a change to 01A "Filtered Higher Resolution" the Media now has the last metadata recorded along with the new 01AB metadata indicating the changes Harry made. Harry now emails 01BA to Fred, where the photo is now called 01ABC. Fred modifies 01ABC by removal of a person in the photo, causing the metadata record to become 01ABCD. Fred sends 01ABCD via social media to Steve, which, upon Steve receiving the media, becomes 01ABCDE. Steve modifies the media by removing the sun from the media, which changes the media and causes the media to become 01ABCDEF, where it currently resides with a URL pointing to its location on the network.

In some examples a digital media interrogation, authentication, and/or verification system can be used to verify chain of custody and/or edit(s) to media such as those illustrated in the conceptual diagram 1000 of FIG. 10. The digital media interrogation, authentication, and/or verification system can verify aspects along the media's journey review the current metadata to understand the details of where it originated, the device used, who, where, when and why, and all the subsequent changes that have been changed from the origination, by whom, where, when, location, device, software used, time/date/digital signing, hash digest, event, photo id, specific changes in metadata including pixel modifications, filters, and other modifications that effected the metadata from the origination of the media. An example above shows Tom's original 01 photos sent to Harry, which Harry filtered in higher resolution. It is entered into the verification interrogation system that shows Harry's resulting changes (noted in red) in the metadata details on record 01B. In this case, it is illustrated that location, time/date, signed by, user/author were all changed along with the filtered higher resolution changes highlighted by the system.

Figure 11:
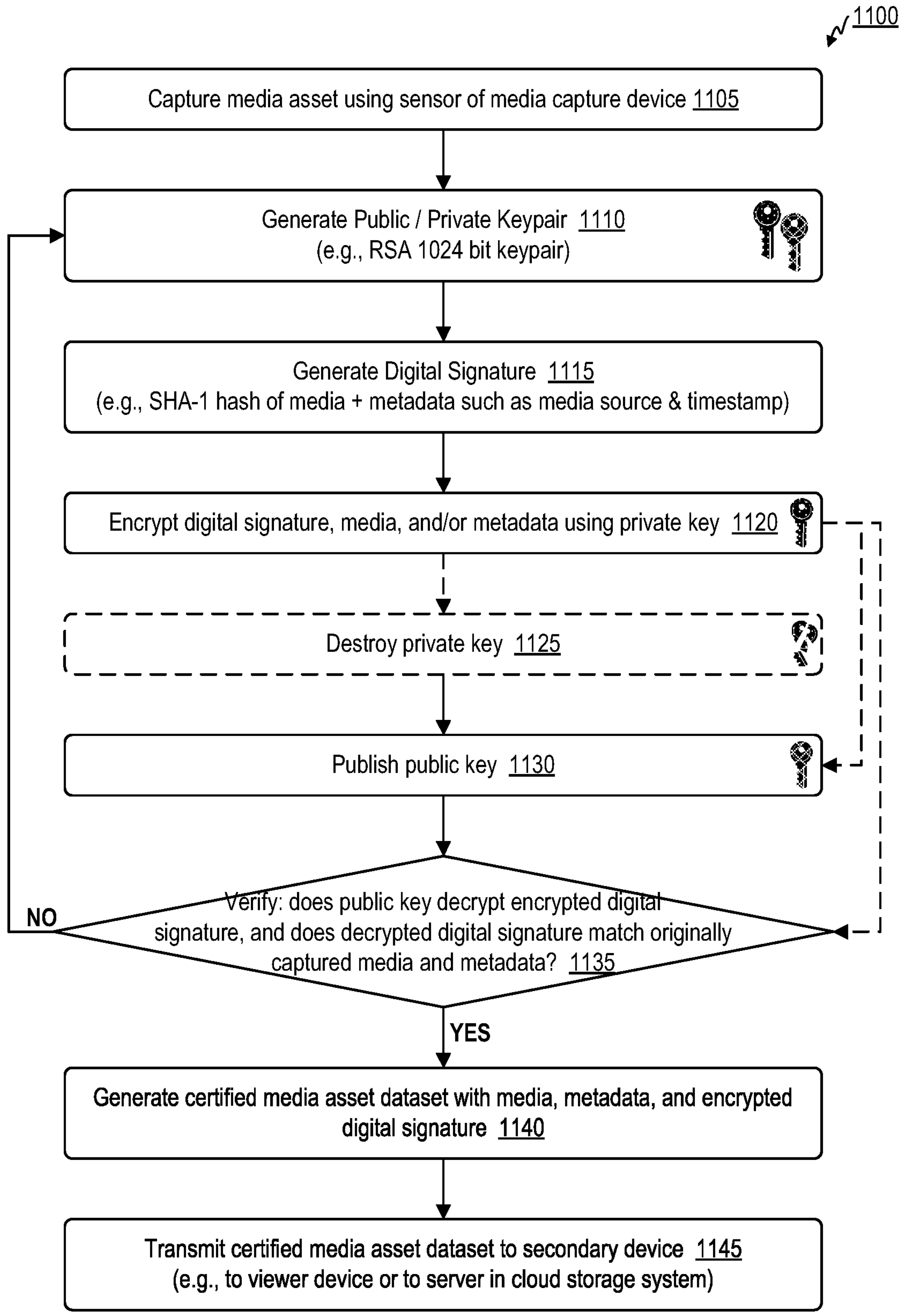
FIG. 11 is a flow diagram illustrating techniques for media certification, in accordance with some examples.

FIG. 11 is a flow diagram illustrating techniques for media certification. At operation 1105, a media asset is captured by a sensor or sensors of a digital media capture device, optionally with its metadata as well. The metadata may include, for example, latitude and longitude coordinates from a GNSS receiver or other positioning receiver, an identification of the media capture device, a timestamp identifying date and time of capture, an altitude at capture, a heading at capture, an inclination at capture, a yaw at capture, a roll at capture, pitch at capture, a watermark, digital signature, an annotation, any other data that might be found in image metadata, EXIF metadata, elevation or altitude, acceleration, velocity at capture, path, speed, direction, distance, weather conditions, barometer reading & change, dew point, humidity, sun angle, temperature, compass heading, media certification status, annotation certification status, incident note certifications status, incident report certification status, event number, time, date, time zone, media title, media type (IR, multi-spectrum, RADAR, LIDAR, UV, 22-dimensionality, 3-dimensionality), wind speed, wind direction, radar data, cloud coverage, visibility, flood data, any other metadata discussed herein, or any operator or AI, or machine selectable combinations thereof.

At operation 1110, an asymmetric public key infrastructure (PKI) key pair—with a private key and a corresponding public key—is generated by the media capture device of operation 1105 or by servers 325. In some cases, the keys of the key pair may be RSA 1024 asymmetric keys. Other types of asymmetric keys may be used.

At operation 1115, a digital signature is computed by generating a hash digest or perceptual hash-optionally using a secure hash algorithm such as SHA-256, of the captured media and optionally of the metadata as well. At operation 1120, the digital signature is encrypted with the private key. The media and/or metadata may also be encrypted using the private key. The private key is optionally destroyed at operation 1125, or may simply never be written to non-volatile memory in the first place.

At operation 1130, the public key is published, either by sending it to the servers 325, to an authentication server such as an independent or $3^{rd}$ party certificate authority, or by otherwise sending it for publication in another publicly accessible and trusted network location. At operation 1135, verification as to the authenticity of the media and metadata (e.g., technical metadata) may occur by decrypting the encrypted digital signature using the public key before or after publication at operation 1130, and verifying whether or not the hash digest stored as part of the decrypted digital signature matches a newly generated hash digest of the media. If the new hash matches the hash decrypted using the public key, then verification is successful, and the media asset has not been modified since capture (or at least since certification). If the new hash does not match the hash decrypted using the public key, then verification is unsuccessful, and the media asset has been modified since capture (or at least since certification). The same can be done using the metadata if a hash digest of the metadata is included in the digital signature. The verification as to the authenticity of the media and metadata at operation 1135 may also include decrypting the media asset and/or the metadata itself, if either or both were encrypted at operation 1120. This verification may occur at the digital media capture device-though it may instead or additionally be performed at a server, for example before the server indexes the media as part of a cloud storage system accessible by client devices.

Once the authentication of operation 1135 succeeds, a certified media dataset is generated by bundling the media, metadata, and the encrypted digital signature, for example in a zip file or other compressed archive file. The public key may also be bundled with them, though additional security may be provided by publishing it elsewhere to a trusted authentication server. At operation 1145, the certified media dataset (and optionally the public key) is transmitted to a secondary device, such as a server or a viewer device (i.e., a client device).

In some cases, additional data besides the media asset and associated metadata may also be certified, either or separately from the media asset or together with the certification of the media asset. If the additional data is certified together with the media asset, the hash and digital signatures at operation 1115 may be hashes of the media asset as well as the additional data, thereby certifying the media asset along with the additional data. If the additional data is certified separately from the media asset, the entire process 1100 may be repeated, with the additional data treated as a media asset. Additional data may include alterations or annotations to a media asset, or at least a subset of a report that is generated based on the media asset, or at least a subset of a report that is generated to include the media asset. Metadata corresponding to the additional data in some cases identifying one or more author(s) of the additional data and/or one or more devices on which the additional data was generated and/or certified, and/or from which the additional data was submitted to the server(s). In some cases, a certain media asset can be associated with multiple additional data items, such as multiple notes, annotations, and/or reports by different authors, the same authors, or some combination thereof.

In other words, the process 1100 of FIG. 11 illustrates data integrity precautions that can be taken. For example, all data (e.g., media asset and/or additional data and/or metadata) can, in some embodiments, be secured in a local database with a globally unique identifier to ensure its integrity. The asset's security and integrity can be ensured via a Digital Signature that is made up of a SHA digest (or other hash digest), the time that the asset was captured and the device of origin. This allows the mobile app or server to detect changes due to storage or transmission errors as well as any attempt to manipulate or change the content of the asset. The Digital Signature can be encrypted with a public/private key-pair that is generated uniquely for that asset by the media capture device. The private key can be destroyed by the media capture device and/or never written to a disk or stored in a memory of the media capture device or any other device; as such, this ensures that the asset cannot be re-signed and cannot be changed without those changes being detectable.

More specifically, media asset data, such as image, video, audio, 3D distance measurements, or other sensor data are captured by a camera, microphone, and/or other sensors integrated with the digital media capture device and/or sensors connected to the digital media capture device in a wired or wireless manner. The digital media capture device also generates and/or extracts metadata, technical metadata, or (e.g., EXIF metadata) corresponding to this captured media asset, for example identifying the digital media capture device, a timestamp of capture, a date of capture, an author or owner of the digital media capture device, and any other metadata. A digital signature is generated by generating a hash of both the captured media and at least some of this metadata. For example, the digital signature may be a hash of the captured media, the timestamp, and an identifier of the digital media capture device that captured the media. The hash may be computed using a secure hash algorithm, such as SHA-256 or greater. The digital media capture device and/or a second device that receives the media asset from the digital media capture device may then generate a public and private key pair using a public key infrastructure (PKI), where the keys may be for example RSA 1024-bit keys. The private key is used to encrypt the digital signature, and may then be deleted, erased, and/or destroyed, in some cases via overwriting for more security. The certified media asset—meaning the media asset, the encrypted digital signature, and the (optionally encrypted) metadata—are uploaded to the cloud severs, in some cases along with the digital signature and/or public key, optionally securely via HTTPS or another secure network transfer protocol. The public key may be uploaded to the same cloud server(s) or to a different system, such as a certificate authority or a third-party authority or a (CA) server. The media asset and its metadata are now certified. Any server or client can retrieve the public key from the cloud server system or CA server and decrypt the encrypted digital signature to verify that it matches a new hash generated using media asset and/or metadata at a later time, thereby verifying that the media asset and metadata have not been changed since certification. The same certification process may be used for additional data based on the media asset, such as annotations, notes, and reports. In some cases, such a verification check is performed at the media capture device or second device before the media asset and metadata and encrypted digital signature and public key are sent by the media capture device or second device to the server(s). In some cases, such a verification check is performed at the server(s) after receipt of the certified media asset.

Metadata may include, for example, media ID, Exchangeable Image File Format (EXIF) data, general data (e.g., file name), color channel data (e.g., red/green/blue (RGB) data), Pixel height data, GNSS date/time/timestamp, International Press Telecommunications Council (IPTC) data, JPEG File Interchange Format (JFIF) data, TIFF metadata, date, time, location, media capture device, user, orientation, author, media file size, media resolution, frame size, elevations, media type, orientation, centimeter 3D GPS position, digital media capture device speed, heading, certification recipe, or some combination thereof. In some examples, metadata may be accessible via a button, link, by scanning a QR code or other optical glyph (e.g., bar code, Aztec code), or a combination thereof.

In some examples, the media certification process of FIG. 11 can further be used to certify device profiles (e.g., device profile 140), imaging data (e.g., imaging data 120-125), edits to media, annotations to media, labels for media, chain of custody of media, changes to metadata of media, and/or other aspects of media and/or media capture devices discussed herein.

Figure 12:
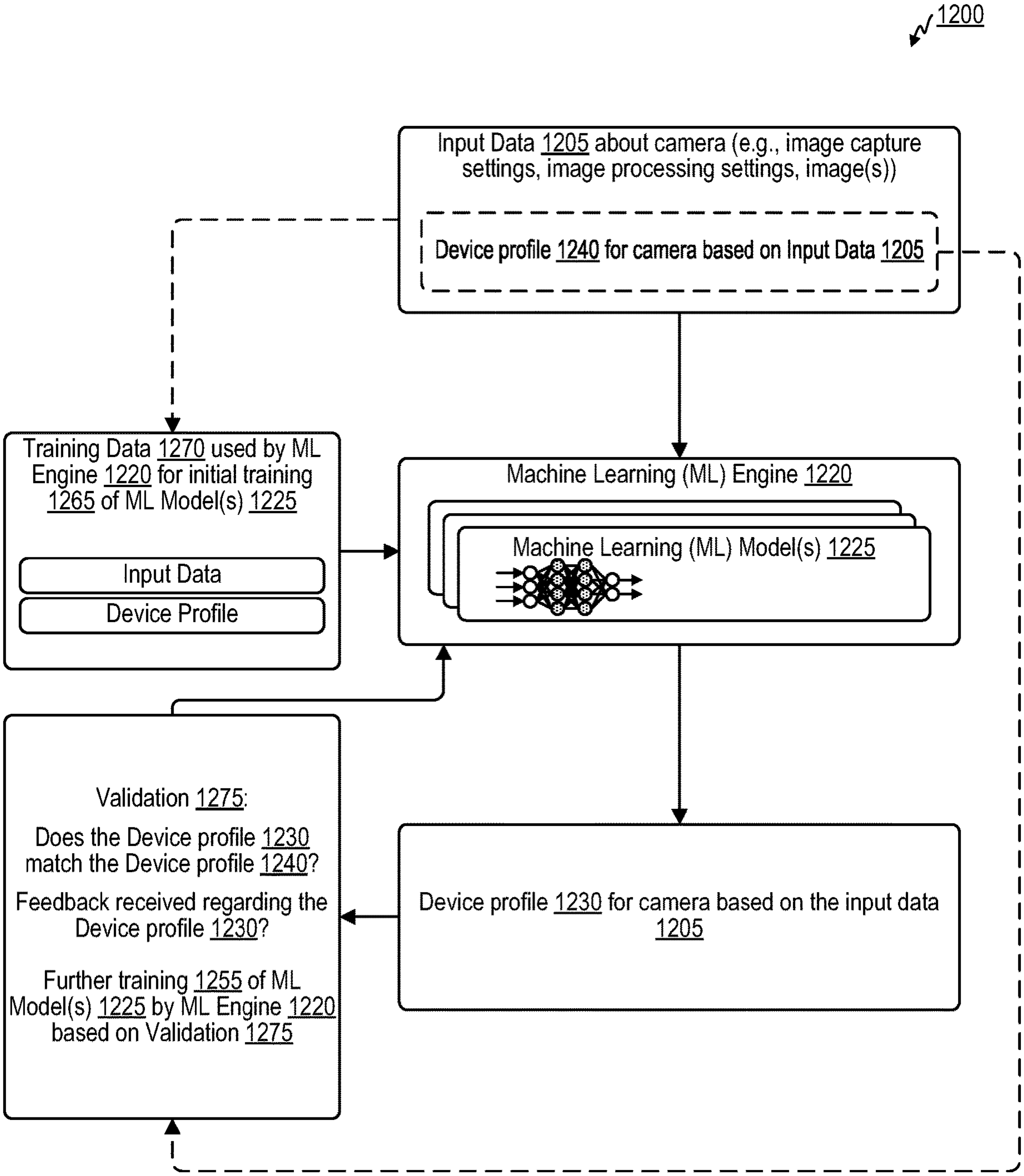
FIG. 12 is a block diagram illustrating the use of one or more trained machine learning models of a machine learning engine to generate an imaging profile for a camera based on input data about the camera, in accordance with some examples.

FIG. 12 is a block diagram 1200 illustrating use of one or more trained machine learning models 1225 of a machine learning engine 1220 to generate a device profile 1230 for a camera based on input data 1205 about the camera. The device profile 1230 may be referred to as an imaging profile, a camera profile, a device profile, a capture profile, a processing profile, an image capture profile, an image processing profile, a settings profile, a configuration profile, or a combination thereof. The ML engine 1220 and/or the ML model(s) 1225 can include one or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more computer vision systems, one or more deep learning systems, one or more classifiers, one or more transformers, or combinations thereof. Within FIG. 12, a graphic representing the trained ML model(s) 1225 illustrates a set of circles connected to another. Each of the circles can represent a node, a neuron, a perceptron, a layer, a portion thereof, or a combination thereof. The circles are arranged in columns. The leftmost column of white circles represents an input layer. The rightmost column of white circles represents an output layer. Two columns of shaded circled between the leftmost column of white circles and the rightmost column of white circles each represent hidden layers. The ML engine 1220 and/or the ML model(s) 1225 can be part of any AI and/or ML modules and/or processes discussed herein.

Once trained via initial training 1265, the one or more ML models 1225 receive, as an input, input data 1205 that identifies information about a camera, such as image capture settings (e.g., exposure time, aperture size, ISO, zoom, lens, focus, analog gain), image processing settings (e.g., digital gain, brightness, contrast, saturation, grain reduction, sharpness, error correction, red eye reduction, color space conversion, tone mapping, color changes), and/or examples of image(s) captured using the camera. In some examples, the input data 1205 identifies the information about the camera (e.g., of any of the types listed above) as tracked over time (e.g., over a period of time), for instance as tracked using at least one database.

Once the one or more ML models 1225 identify the device profile 1230, the device profile 1230 can be output to an output interface that can indicate the device profile 1230 to a user (e.g., by displaying the device profile 1230 using a display or playing audio indicative of the device profile 1230 using a speaker or headphones) and/or to a recipient device that can simulate the camera, such as a second camera.

Before using the one or more ML models 1225 to identify the device profile 1230, the ML engine 1220 performs initial training 1265 of the one or more ML models 1225 using training data 1270. The training data 1270 can include examples of input data identifying camera information (e.g., tracking camera information over time) (e.g., as in the input data 1205) and/or examples of a pre-determined device profile (e.g., as in the pre-determined device profile 1240). In some examples, the pre-determined device profile(s) in the training data 1270 are device profile(s) that the one or more ML models 1225 previously identified based on the input data in the training data 1270. In the initial training 1265, the ML engine 1220 can form connections and/or weights based on the training data 1270, for instance between nodes of a neural network or another form of neural network. For instance, in the initial training 1265, the ML engine 1220 can be trained to output the pre-determined device profile in the training data 1270 in response to receipt of the corresponding input data in the training data 1270.

During a validation 1275 of the initial training 1265 (and/or further training 1255), the input data 1205 (and/or the exemplary input data in the training data 1270) is input into the one or more ML models 1225 to identify the device profile 1230 as described above. The ML engine 1220 performs validation 1275 at least in part by determining whether the identified device profile 1230 matches the pre-determined device profile 1240 (and/or the pre-determined device profile in the training data 1270). If the device profile 1230 matches the pre-determined device profile 1240 during validation 1275, then the ML engine 1220 performs further training 1255 of the one or more ML models 1225 by updating the one or more ML models 1225 to reinforce weights and/or connections within the one or more ML models 1225 that contributed to the identification of the device profile 1230, encouraging the one or more ML models 1225 to make similar device profile determinations given similar inputs. If the device profile 1230 does not match the pre-determined device profile 1240 during validation 1275, then the ML engine 1220 performs further training 1255 of the one or more ML models 1225 by updating the one or more ML models 1225 to weaken, remove, and/or replace weights and/or connections within the one or more ML models that contributed to the identification of the device profile 1230, discouraging the one or more ML models 1225 from making similar device profile determinations given similar inputs.

Validation 1275 and further training 1255 of the one or more ML models 1225 can continue once the one or more ML models 1225 are in use based on feedback 1250 received regarding the device profile 1230. In some examples, the feedback 1250 can be received from a user via a user interface, for instance via an input from the user interface that approves or declines use of the device profile 1230 for simulating the camera. In some examples, the feedback 1250 can be received from another component or subsystem, for instance based on whether the component or subsystem successfully uses the device profile 1230, whether use the device profile 1230 causes any problems for the component or subsystem, whether use the device profile 1230 are accurate, or a combination thereof. If the feedback 1250 is positive (e.g., expresses, indicates, and/or suggests approval of the device profile 1230, success of the device profile 1230, and/or accuracy the device profile 1230), then the ML engine 1220 performs further training 1255 of the one or more ML models 1225 by updating the one or more ML models 1225 to reinforce weights and/or connections within the one or more ML models 1225 that contributed to the identification of the device profile 1230, encouraging the one or more ML models 1225 to make similar device profile determinations given similar inputs. If the feedback 1250 is negative (e.g., expresses, indicates, and/or suggests disapproval of the device profile 1230, failure of the device profile 1230, and/or inaccuracy of the device profile 1230) then the ML engine 1220 performs further training 1255 of the one or more ML models 1225 by updating the one or more ML models 1225 to weaken, remove, and/or replace weights and/or connections within the one or more ML models that contributed to the identification of the device profile 1230, discouraging the one or more ML models 1225 to make similar device profile determinations given similar inputs.

Figure 13:
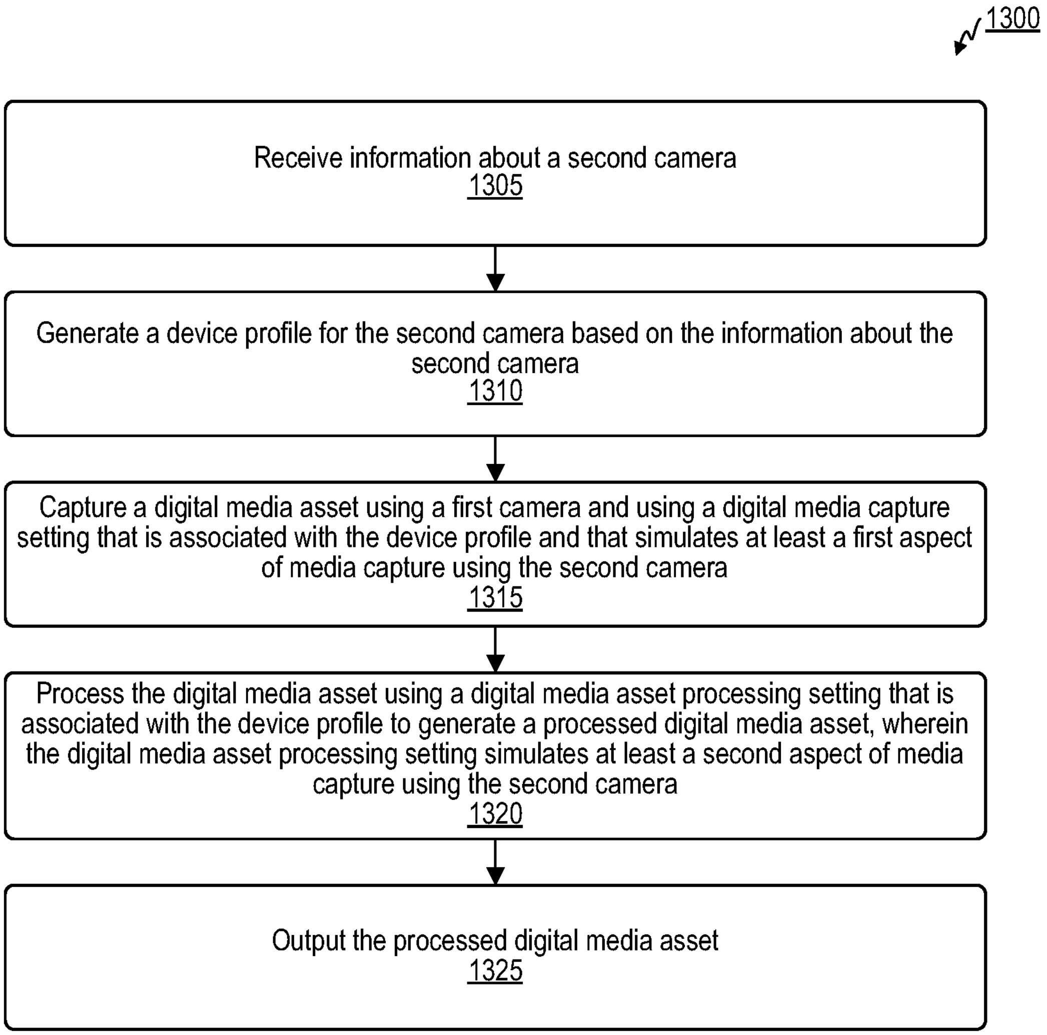
FIG. 13 is a flow diagram illustrating a process for media analysis, in accordance with some examples

FIG. 13 is a flow diagram illustrating a process 1300 for media analysis. In some examples, the process 1300 is performed by a digital media system. The digital media system can include the computing system 3000, and/or any of the systems, subsystems, apparatuses, components, devices, cameras, non-transitory computer readable storage media/mediums, processors, and/or other elements discussed herein with respect to any of the other figures herein.

At operation 1305, the digital media system is configured to, and can, receive information about a second camera (e.g., second camera 115). Examples of the information about the second camera include the imaging data 125 and the device data 145 that pertains to the second camera 115.

At operation 1310, the digital media system is configured to, and can, generate a device profile for the second camera based on the information about the second camera. In some examples, the device profile for the second camera is configured for, and can, simulating use and/or operation of the second camera. The device profile may be referred to as an imaging profile, a camera profile, a media profile, a capture profile, a processing profile, an image capture profile, an image processing profile, a settings profile, a configuration profile, or a combination thereof. Examples of the device profile include device profile 140, device profile 215, device profile 315, device profile 415, device profile 515, device profile 520, and device profile 530.

At operation 1315, the digital media system is configured to, and can, capture a digital media asset using the first camera and using a digital media capture setting that is associated with the device profile and that simulates at least a first aspect of media capture using the second camera. In some aspects, the digital media asset includes an image, a video, other visual data, audio, a depth image, a point cloud, a 3D model, a 3D mesh, a texture for a 3D mesh, other depth data, a document, text, or a combination thereof.

At operation 1320, the digital media system is configured to, and can, process the digital media asset using a digital media asset processing setting that is associated with the device profile to generate a processed digital media asset, wherein the digital media asset processing setting simulates at least a second aspect of media capture using the second camera.

In some aspects, the device profile includes the digital media asset capture setting. In some aspects, the device profile includes the digital media asset processing setting.

In some aspects, the information about the second camera includes a second camera media capture setting associated with capture of a second camera media asset by the second camera, and the device profile is based on at least the second camera media capture setting. For instance, the device profile may be based on default values for, and possible ranges of values for, various image capture settings of the second camera, such as exposure time, aperture size, ISO, digital gain, analog gain, focus, white balance, noise reduction, sharpness, tone mapping, color saturation, or a combination thereof.

In some aspects, the information about the second camera includes a second camera media processing setting associated with processing of a second camera media asset by the second camera, and the device profile is based on at least the second camera media processing setting. For instance, the device profile may be based on default values for, and possible ranges of values for, various image processing settings of the second camera, such as noise reduction, sharpness, tone mapping, color saturation, brightness, contrast, blurring, vignetting, low-pass filtering, high-pass filtering, band-pass filtering, deblocking, filtering, color mapping, pixel correction, red eye correction, or a combination thereof.

In some aspects, the information about the second camera identifies a hardware component of the second camera, and the device profile is based on at least the hardware component of the second camera. For instance, the device profile may indicate the digital media asset capture setting and/or the digital media asset processing setting to simulate the hardware component, for instance to simulate a particular lens, aperture size, zoom level, image sensor size, or other hardware component of the second camera.

In some aspects, the digital media system is configured to, and can, receive information about the first camera, and the device profile for the second camera can also be based on the information about the first camera. An example of the first camera can be, for instance, the first camera 110 of the user device 105, or of the user device 625. The information about the first camera can include, for instance, the imaging data 120 and/or device data 145 pertaining to the user device 105 and/or the first camera 110. In some aspects, the information about the first camera includes a first camera media capture setting associated with capture of a first camera media asset by the first camera, and the device profile is based on at least the first camera media capture setting. For instance, the device profile can align first camera media capture setting(s) of the first camera with corresponding second camera media capture setting(s) of the second camera. In some aspects, the information about the second camera identifies a hardware component of the first camera, and the device profile is based on at least the hardware component of the first camera. For instance, in some examples, the device profile can be based on a difference in hardware between the first camera and the second camera, and compensating for that difference in hardware (e.g., difference in lenses, difference in maximum aperture size, difference in sensor size).

In some aspects, the digital media system is configured to, and can, identify, based on the information about the first camera, one or more settings of the first camera that simulate application of at least a specific setting at the second camera, with at least one of the one or more settings of the first camera being distinct from the specific setting of the second camera. In some aspects, the one or more settings at least one of the one or more settings of the first camera compensates for a hardware difference between the first camera and the second camera. For instance, in an illustrative example, the second camera may have a larger maximum aperture size than the first camera of the user device. To simulate certain settings of the second camera that use the maximum aperture size (or another aperture size larger than the what the first camera is capable of), the device profile can maximize the aperture size of the first camera, increase the exposure time of the first camera (to compensate for not being able to increase its aperture size as wide as the second camera), and increase sharpness and/or contrast in image processing settings (e.g., to compensate for increased blur caused by the longer exposure time). The amount by which the exposure time is increased can be selected to provide an increase in brightness and/or luminosity that simulates the increase in increase in brightness and/or luminosity that would be provided by the larger aperture size in the second camera.

In some aspects, the first aspect of media capture using the second camera is the second aspect of media capture using the second camera. In some aspects, the first aspect of media capture using the second camera and the second aspect of media capture using the second camera are both associated with at least one second camera media capture setting of the second camera. In some aspects, the first aspect of media capture using the second camera is associated with at least one second camera media capture setting of the second camera, and wherein the second aspect of media capture using the second camera is associated with at least one second camera media processing setting of the second camera. In some aspects, at least one of the first aspect of media capture using the second camera or the second aspect of media capture using the second camera is associated with a hardware difference between the first camera and the second camera.

In some aspects, the information about the second camera identifies the interface of the second camera, and the digital media system is configured to, and can, generate, based on the device profile, an interactive virtual interface that simulates an interface of the second camera. Examples of the interactive virtual interface include the virtual interface 305 and the virtual interface 410. Examples of the interface of the second camera include the hardware interface elements 310 and the virtual interface 405. In some aspects, the digital media system is configured to, and can, display the interactive virtual interface using a touchscreen, receive a touch input via the touchscreen while the interactive virtual interface is displayed using the touchscreen, and adjust, based on the touch input, at least one setting (e.g., the digital media capture setting and/or the digital media asset processing setting) by an increment. The increment simulates an adjustment of the at least one setting at the second camera. For instance, the increment can match an increment by which the same at least one setting would be adjusted using the interface of the second camera.

At operation 1325, the digital media system is configured to, and can, output the processed digital media asset.

In some aspects, the digital media system is configured to, and can, track movement of the digital media asset across a plurality of devices, as in FIGS. 9 and 10. In some aspects, the digital media system is configured to, and can, certify the processed digital media asset as in FIG. 11.

In some aspects, the digital media system is configured to, and can, generate the device profile by processing at least the information about the second camera (and/or information about the first camera) using one or more trained machine learning models (e.g., trained machine learning model(s) 1225), as in FIG. 12. In some aspects, the digital media system is configured to, and can, further train the one or more trained machine learning models based on feedback regarding the device profile, the processed digital media asset, or a combination thereof.

In some aspects, the device profile includes the one or more digital media asset capture settings associated with the device profile for the second camera. In some aspects, the device profile includes the one or more digital media asset processing settings associated with the device profile for the second camera.

In some aspects, the information about the second camera includes one or more digital media asset capture settings used by the second camera to capture one or more digital media assets. The device profile for the second camera is indicative of the one or more digital media asset capture settings used by the second camera to capture one or more digital media assets. The one or more digital media asset capture settings associated with the device profile for the second camera are based on the one or more digital media asset capture settings used by the second camera to capture one or more digital media assets.

In some aspects, the information about the second camera includes one or more digital media asset capture settings used by the second camera to capture one or more digital media assets. The device profile for the second camera is indicative of the one or more digital media asset capture settings used by the second camera to capture one or more digital media assets. Processing the digital media asset using the one or more digital media asset processing settings associated with the device profile includes processing the digital media asset to simulate at least one of the one or more digital media asset capture settings used by the second camera to capture one or more digital media assets.

In some aspects, the information about the second camera includes one or more digital media asset processing settings used by the second camera to process one or more digital media assets captured using the second camera. The device profile for the second camera is indicative of the one or more digital media asset processing settings used by the second camera to process the one or more digital media assets. Processing the digital media asset using the one or more digital media asset processing settings associated with the device profile includes processing the digital media asset to simulate at least one of the one or more digital media asset processing settings used by the second camera to process the one or more digital media assets.

In some aspects, the information about the second camera identifies a type of lens used by the second camera, wherein the device profile for the second camera is indicative of the type of lens used by the second camera, and wherein processing the image using the one or more image processing settings associated with the device profile includes processing the image to simulate the internal or external type of lens used by the second camera. For instance, the type of lens can include a telephoto lens, macro lens, cinematic lens, zoom lens, wide-angle lens, ultrawide angle lens, fisheye lens, convex lens, concave lens, standard lens, tilt shift lens, infrared lens, light filtering lens, prismatic lens, specialty lens, lens with distortion or other lens adaptors allowing the use of any third party type lens.

In some aspects, the digital media system is configured to, and can, generate a touchscreen user interface based on an interface of the second camera; display the touchscreen user interface using a touchscreen; receive one or more touch inputs, touch functions, audio tapback/alerts, voice control or gestures control via the touchscreen while the touchscreen user interface is displayed using the touchscreen; and adjust, based on the one or more touch inputs, at least one of the one or more image capture settings associated with the device profile for the second camera or the one or more image processing settings associated with the device profile for the second camera.

Figure 14:
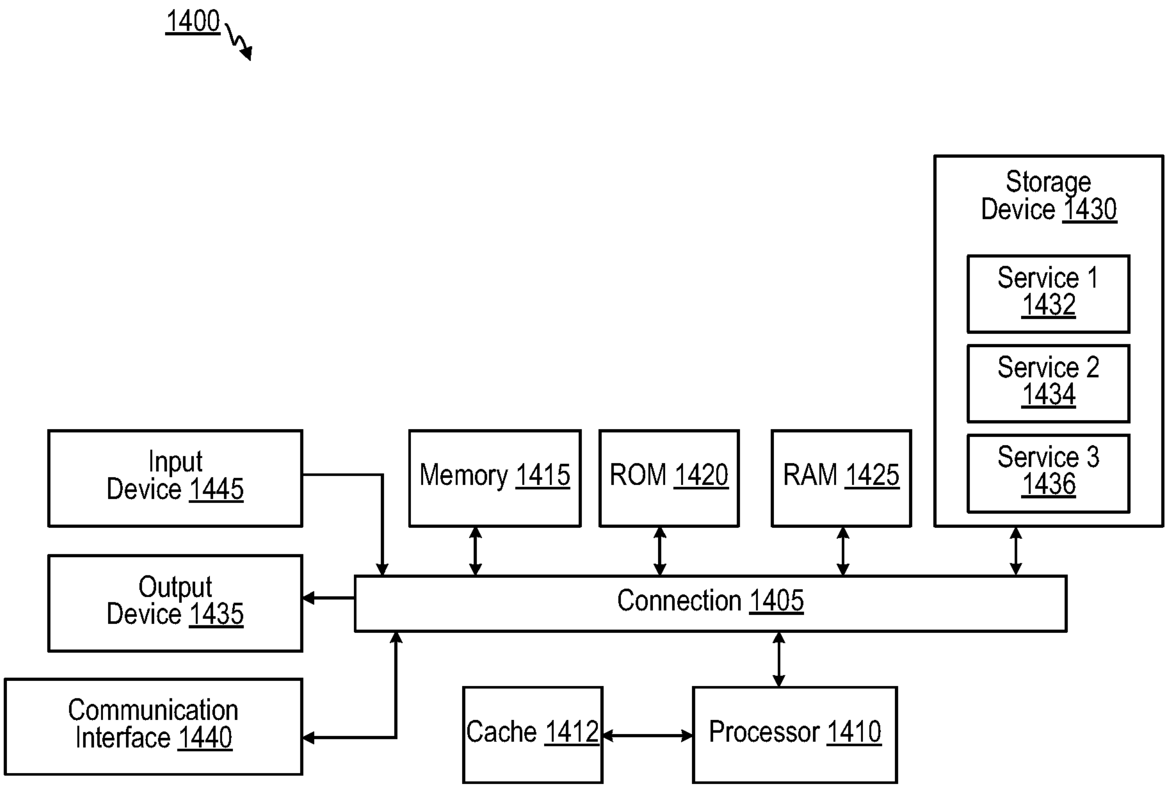
FIG. 14 is a block diagram illustrating an example of a computing system for implementing certain aspects described herein.

FIG. 14 is a diagram illustrating an example of a system for implementing certain aspects of the present technology. In particular, FIG. 14 illustrates an example of computing system 1400, which can be for example any computing device making up internal computing system, a remote computing system, a sensor or sensors, a camera, or multiple cameras operating as a system or any component thereof in which the components of the system are in communication with each other using connection 1405. Connection 1405 can be a physical connection using a bus, or a direct connection into processor 1410, such as in a chipset architecture. Connection 1405 can also be a virtual connection, networked connection, or logical connection.

In some aspects, computing system 1400 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1400 includes at least one processing unit (CPU or processor) 1410 and connection 1405 that couples various system components including system memory 1415, such as read-only memory (ROM) 1420 and random access memory (RAM) 1425 to processor 1410. Computing system 1400 can include a cache 1412 of high-speed memory connected directly with, in close proximity to, or integrated as part of processor 1410.

Processor 1410 can include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input camera mechanisms, such as a image sensor(s) for media capture, a digital camera, a cpu camera, a smartphone sensor, a remote image sensor, microphone for audio capture, speech control or sound, a touch-sensitive screen for gesture or graphical input, keyboard, mouse, motion input, speech, etc. Computing system 1400 can also include output device 1435, which can be one or more of a number of output mechanisms. In some instances, multimodal systems can enable a user to provide multiple types of input/output to communicate with computing system 1400. Computing system 1400 can include communications interface 1440, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, satellite phone, satellite system such as StarLink, dedicated short range communication (DSRC) wireless signal transfer, 1402.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1430 can include software services, servers, services??, etc., that when the code that defines such software is executed by the processor 1410, it causes the system to perform a function. In some aspects, a hardware service that performs a particular function can include the software component stored in a computer-readable medium in connection with the necessary hardware components, such as processor 1410, connection 1405, output device 1435, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("$<$") and greater than ("$>$") symbols or terminology used herein can be replaced with less than or equal to ("$\leq$") and greater than or equal to ("$\geq$") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. An apparatus for media capture device simulation, the apparatus comprising:
- a first camera;
- at least one memory storing instructions; and
- at least one processor, wherein execution of the instructions by the at least one processor causes the at least one processor to:
  - receive second camera information about one or more imaging characteristics of a second camera, wherein the second camera has at least one hardware difference relative to the first camera;
  - generate a device profile for the second camera based on the second camera information about the second camera and first camera information about the first camera;
  - capture a digital media asset using the first camera and using a digital media capture setting that is associated with the device profile and that compensates for the at least one hardware difference to simulate the one or more imaging characteristics of the second camera while a second camera setting is applied to the second camera;
  - process the digital media asset using a digital media asset processing setting that is associated with the device profile to generate a processed digital media asset, wherein the digital media asset processing setting compensates for the at least one hardware difference to simulate the one or more imaging characteristics using the second camera while the second camera setting is applied to the second camera, wherein the digital media capture setting and the digital media asset processing setting both differ from the second camera setting of the second camera; and
  - output the processed digital media asset.

2. The apparatus of claim 1, wherein the device profile includes the digital media capture setting.

3. The apparatus of claim 1, wherein the device profile includes the digital media asset processing setting.

4. The apparatus of claim 1, wherein the second camera information includes the second camera setting associated with media capture by the second camera, wherein the device profile is based on at least the second camera setting.

5. The apparatus of claim 1, wherein the second camera information about the second camera identifies a hardware component of the second camera, and wherein the device profile is based on at least the hardware component of the second camera.

6. The apparatus of claim 1, wherein the execution of the instructions by the at least one processor causes the at least one processor to:
- convert the second camera setting for the first camera based on the device profile to identify the digital media capture setting.

7. The apparatus of claim 1, wherein the first camera information about the first camera includes a first camera media capture setting associated with capture of a first camera media asset by the first camera, and wherein the device profile is based on at least the first camera media capture setting.

8. The apparatus of claim 1, wherein the first camera information about the first camera identifies a hardware component of the first camera, and wherein the device profile is based on at least the hardware component of the first camera.

9. The apparatus of claim 1, wherein the digital media capture setting and the digital media asset processing setting are both distinct from the second camera setting of the second camera.

10. The apparatus of claim 1, wherein the execution of the instructions by the at least one processor causes the at least one processor to:

convert the second camera setting for the first camera based on the device profile to identify the digital media asset processing setting.

11. The apparatus of claim 1, wherein the digital media capture setting compensates for a first aspect of the at least one hardware difference to simulate the one or more imaging characteristics of the second camera while the second camera setting is applied to the second camera, and wherein the digital media asset processing setting compensates for a second aspect of the at least one hardware difference to simulate the one or more imaging characteristics of the second camera while the second camera setting is applied to the second camera.

12. The apparatus of claim 1, wherein the second camera setting of the second camera is associated with the at least one hardware difference.

13. The apparatus of claim 1, wherein the at least one hardware difference is associated with a difference in image brightness between the first camera and the second camera, wherein at least one of the digital media capture setting or the digital media asset processing setting compensates for the difference in image brightness.

14. The apparatus of claim 1, wherein the at least one hardware difference includes at least one of a different sensor type, a different lens type, a different maximum aperture size, or a different zoom level.

15. The apparatus of claim 1, wherein the execution of the instructions by the at least one processor causes the at least one processor to:

generate, based on the device profile, an interactive virtual interface that simulates an interface of the second camera, wherein the second camera information about the second camera includes interface information about the interface of the second camera.

16. The apparatus of claim 15, wherein the execution of the instructions by the at least one processor causes the at least one processor to:

display the interactive virtual interface using a touchscreen;

receive a touch input via the touchscreen while the interactive virtual interface is displayed using the touchscreen; and adjust, based on the touch input, at least one setting by an increment, wherein the increment simulates an adjustment of the at least one setting at the second camera, and wherein the at least one setting includes at least one of the digital media capture setting or the digital media asset processing setting.

17. The apparatus of claim 1, wherein the digital media asset includes at least one of an image, a video, or audio.

18. The apparatus of claim 1, wherein the execution of the instructions by the at least one processor causes the at least one processor to:

track one or more transfers of the digital media asset between a plurality of devices.

19. A method for media capture device simulation, the method comprising:

receiving second camera information about one or more imaging characteristics of a second camera, wherein the second camera has at least one hardware difference relative to a first camera;

generating a device profile for the second camera based on the second camera information about the second camera and first camera information about the first camera;

capturing a digital media asset using the first camera and using a digital media capture setting that is associated with the device profile and that compensates for the at least one hardware difference to simulate the one or more imaging characteristics of the second camera while a second camera setting is applied to the second camera;

processing the digital media asset using a digital media asset processing setting that is associated with the device profile to generate a processed digital media asset, wherein the digital media asset processing setting compensates for the at least one hardware difference to simulate the one or more imaging characteristics the second camera while the second camera setting is applied to the second camera, wherein the digital media capture setting and the digital media asset processing setting both differ from the second camera setting of the second camera; and outputting the processed digital media asset.

20. A non-transitory computer readable storage medium having embodied thereon a program, wherein the program is executable by a processor to perform a method of media capture device simulation, the method comprising:

receiving second camera information about one or more imaging characteristics of a second camera, wherein the second camera has at least one hardware difference relative to a first camera;

generating a device profile for the second camera based on the second camera information about the second camera and first camera information about the first camera;

capturing a digital media asset using the first camera and using a digital media capture setting that is associated with the device profile and that compensates for the at least one hardware difference to simulate the one or more imaging characteristics of the second camera while a second camera setting is applied to the second camera;

processing the digital media asset using a digital media asset processing setting that is associated with the device profile to generate a processed digital media asset, wherein the digital media asset processing setting compensates for the at least one hardware difference to simulate the one or more imaging characteristics the second camera while the second camera setting is applied to the second camera, wherein the digital media capture setting and the digital media asset processing setting both differ from the second camera setting of the second camera; and outputting the processed digital media asset.

* * * * *